(12) United States Patent
Kono et al.

(10) Patent No.: US 7,353,841 B2
(45) Date of Patent: Apr. 8, 2008

(54) RELATIVE PRESSURE CONTROL SYSTEM AND RELATIVE FLOW CONTROL SYSTEM

(75) Inventors: Tetsujiro Kono, Komaki (JP); Hiroki Doi, Komaki (JP); Minoru Ito, Komaki (JP); Hideki Nagaoka, Nirasaki (JP); Keiki Ito, Nirasaki (JP); Hiroki Endo, Nirasaki (JP); Tsuyoshi Shimazu, Nirasaki (JP); Jun Hirose, Nirasaki (JP); Osamu Katsumata, Nirasaki (JP); Kazuyuki Miura, Nirasaki (JP); Takashi Kitazawa, Nirasaki (JP)

(73) Assignees: CKD Corporation, Komaki (JP); Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/295,649

(22) Filed: Dec. 7, 2005

(65) Prior Publication Data
US 2006/0097644 A1 May 11, 2006

Related U.S. Application Data

(63) Continuation of application No. PCT/JP2004/007819, filed on Jun. 4, 2004.

(30) Foreign Application Priority Data

Jun. 9, 2003 (JP) .............................. 2003-163948

(51) Int. Cl.
*G05D 11/13* (2006.01)
*G05D 16/20* (2006.01)

(52) U.S. Cl. ..................... 137/487.5; 137/14; 137/883; 118/715

(58) Field of Classification Search .................. 137/14, 137/486, 487.5, 883, 12, 599.01, 599.06; 118/715; 438/935; 700/282
See application file for complete search history.

(56) References Cited

U.S. PATENT DOCUMENTS

| 3,556,126 | A | * | 1/1971 | Oswald | ................. 137/118.04 |
| 6,590,344 | B2 | | 7/2003 | Tao et al. | |
| 6,631,334 | B2 | * | 10/2003 | Grosshart | ..................... 702/50 |
| 6,752,166 | B2 | * | 6/2004 | Lull et al. | ....................... 137/9 |
| 2002/0038669 | A1 | * | 4/2002 | Yamagishi et al. | .... 137/118.04 |

FOREIGN PATENT DOCUMENTS

| JP | A 2000-20135 | 1/2000 |
| JP | A 2000-163137 | 6/2000 |
| JP | A 2001-116009 | 4/2001 |
| JP | A 2002-217171 | 8/2002 |

* cited by examiner

*Primary Examiner*—Ramesh Krishnamurthy
(74) *Attorney, Agent, or Firm*—Oliff & Berridge, PLC

(57) ABSTRACT

Provided is a relative pressure control system has a simple configuration, but enables accurate regulation of a division ratio of an operation gas, and concurrently makes it possible to securely drain the operation gas from an operation gas pipeline in case of emergency. The system includes a plurality of air operated valves of a normally open type that are connected to an operation gas pipeline supplied with an operation gas; pressure sensors that are series connected to the respective air operated valves and that detect output pressures of the respective air operated valves; a controller that controls operation pressures of the respective air operated valves in accordance with the pressures detected by the pressure sensors; and a hard interlock solenoid valve that correlates the plurality of air operated valves to one another so that at least one of the plurality of air operated valves is normally opened. In the configuration, an opening of a specified one of the plurality of air operated valves is regulated, the operation gas is output at a predetermined division ratio.

14 Claims, 30 Drawing Sheets

FIG.10

RELATIVE PRESSURE CONTROL SYSTEM AND RELATIVE FLOW CONTROL SYSTEM

This is a Continuation of International Application No. PCT/JP2004/007819 filed Jun. 4, 2004, which claims the benefit of Japanese Patent Application No. 2003-163948 filed Jun. 9, 2003. The entire disclosure of the prior application is hereby incorporated by reference herein in its entirety.

BACKGROUND OF THE INVENTION

1. Field of the Invention

The invention relates to a relative pressure control system and a relative flow control system that control a supplied flow of operating gas to be divided for two systems and to be output at a predetermined division ratio.

2. Description of the Related Art

Conventionally known etching gas supply systems include those of the type that supplies a low-pressure etching gas to a center area and edge area of a wafer. FIG. 29 is a schematic diagram of an overall configuration of a conventional etching gas supply system 300. FIG. 30 is a selectively enlarged cross sectional view of a focus ring 307 shown in FIG. 29.

The conventional etching gas supply system 300 has a vacuum reaction chamber 301 for performing etching. The vacuum reaction chamber 301 has a lower electrode 303 for the use of mounting wafers 302 one by one, and a shower plate 304 is provided thereabove. The shower plate 304 is connected via an operating gas pipeline 306 to flow control valves 305a to 305d. These control valves, respectively, adjust the compositions and flow rates of the operating gases that are supplied from gas sources of, for example, $O_2$, Ar, $C_4F_8$, and CO, which are different from one another.

The lower electrode 303 has a focus ring 307 provided in an annular manner such as to surround the outer periphery of the wafer 302. As shown in FIG. 30, the focus ring 307 is formed in the form of a cross-sectional rectangle. A gas flow path 307a abutting the lower electrode 303 is formed concentric with the focus ring 307 on a face contacting the lower electrode 303, and is extended in fluid communication with a plurality of injection ports 307b. As shown in FIG. 29, the gas flow path 307a is connected via an operating gas pipeline 309 to flow control valves 308a to 308d. These control valves, respectively, regulate the flow rates and compositions of operating gases that are supplied from gas sources of, for example, $O_2$, Ar, $C_4F_8$, and $CHF_3$, which are different from one another.

The vacuum reaction chamber 301 is provided with an optical system that monitors plasma conditions. An arithmetic processor section 312 inputs an optical signal through an optical divider 311, monitors etching rates, uniformity, and the like of a center area and edge area of the wafer 302, open and close operations of the flow control valves 308a to 308d in accordance with the monitoring results.

Thus, the operating gas is supplied to the center area of the wafer 302 from the shower plate 304. Concurrently, the operating gas is injected onto the edge area of the wafer 302 correspondingly to the process condition of the operating gas from the injection ports 307b of the focus ring 307. Consequently, the wafer 302 can be supplied overall with the operating gas. (see Japanese Unexamined Patent Application Publication No. 2002-217171 (pp. 3 and 4; FIGS. 1 and 2), for example).

(First Problems)

However, in the conventional etching gas supply system 300, the wafer 302 is supplied with the operating gas from the shower plate 304 and the injection ports 307b of the focus ring 307, so that various redundant components are provided. For example, two flowlines, namely, the operating gas pipeline 306 and the operating gas pipeline 309, are provided, and the flow control valves 305a to 305d and 308a to 308d are necessary. In addition, while the control operations of the flow control valves 305a to 305d are being predicted in accordance with the actually processed operating gas on the wafer 302, and the flow rate of the operating gas being injected from the injection ports 307b of the focus ring 307 is controlled. As such, a case can take place wherein the etching gas cannot be uniformly sprayed on the wafer 302.

To overcome the above-described problem, a configuration as shown in FIG. 31 can be contemplated, for example. In this case, a relative pressure control system 310, which controls the etching gas flowing through the operating gas pipeline, is assembled into an etching gas supply system 320. In the configuration, the etching gas is sprayed onto the center area and edge area of a wafer 57 from a center shower 55 and edge shower 56 of an etching shower 54 provided inside a chamber 51. More specifically, solenoid valves 322A and 322B (or, piezoelectric valves, for example) are parallel connected to an operating gas supply valve 53 provided to the operating gas pipeline. In addition, the solenoid valves 322A and 322B are connected to the center shower 55 and edge shower 56 of the etching shower 54 through pressure sensors 323A and 323B. The solenoid valves 322A and 322B, respectively, are controlled by a controller 325 in accordance with detection results obtained by the pressure sensors 323A and 323B. Then, the etching gas flowing through the operating gas pipeline is output at predetermined division ratios, thereby to be sprayed onto the wafer 57 from the center shower 55 and edge shower 56 of the etching shower 54.

However, when the controller 325 enters the state of a runaway, the relative pressure control system 310 is unable to detect the runaway. As such, the operational states of the solenoid valves 322A and 322B (or, piezoelectric valves) that electrically control the open and close operations cannot be recognized. This can probably cause a case wherein although the solenoid valves 322A and 322B are both in fully opened states, the runaway state cannot be recognized. This consequently permits the etching gas to remain in the operating gas pipeline that connects between the operating gas supply valve 53 and the solenoid valves 322A and 322B in, for example, case of emergency, such as the case of a runaway of the controller 325. In such an emergency case, it is demanded that in the etching gas supply system 320, the etching gas be securely drained from the operating gas pipeline. However, a problem remains in that the requirement cannot be satisfied with the solenoid valves 322A and 322B (or, piezoelectric valves, for example) that electrically control on-off valve operations.

(Second Problems)

The method shown in FIG. 31, however, has a problem as described below. Generally speaking, as a method of determining a control objective valve, a method can be contemplated wherein, on the condition that the C/E (center/edge) ratio of a shower plate is 1.000, when the objective pressure ratio is 1.000 or lower, a center-side valve is determined to be a control objective valve. Alternatively, when the objective pressure ratio is greater than 1.000, the edge-side valve is determined to be the control objective valve. However, this method has a problem as described herebelow.

(1) Due, for example, to differences depending on pipeline and/or throttling conditions, to variations of sensor calibration, and to variations in the CV values of the control valves, there occur variations in the actual C/E ratio (which is not limited to 1.000, but is variable to 0.950, 1.080, or the like). This leads to occurrence of a noncontrollable zone (zone between 1.000 and 0.950) corresponding to the variations.

In order to overcome the problem, the configuration may be such that the respective control valve is held standby in a full open mode and is controlled after the flow rate has been stabilized. In this configuration, however, while the noncontrollable zone is not caused, the responsiveness is low, so that requirements for high-speed responsiveness cannot be satisfied. In more specific, in the state after determining the actual pressure ratio to be 0.950, if the control pressure ratio is 0.950 or lower with respect to a pressure ratio C/E of 0.950, then the center-side valve is controlled; and if the control pressure ratio is greater than 0.950, then the edge-side valve is controlled. In this case, no noncontrollable zone is not caused, however, a loss occurs in time necessary to determine the pressure ratio in an inactive state to be 0.950.

(2) In addition, generally, according to a method, the noncontrol-side valve is held in the full open state, and only the other valve is controlled. In the method, when the objective flow rate varies from 200 sccm to 1000 sccm during the partial pressure control, there can occur a noncontrollable event (wherein the flow rate is not converged into the objective value), wherein the event is determined to be abnormal, and valve shift operation is performed. However, the amounts of time used to, for example, determine the abnormality and shift the valve are losses, thereby reducing the responsiveness.

(Third Problems)

An embodiment corresponding to claim 10 for solving the second problem is predicted to have a problem described herebelow.

The control objective valve is determined by determining the threshold value in accordance with the theoretical ratio of the shower plate serving as a device (for example, when the theoretical ratio, is a pressure ratio of 1.000, the threshold value is 1.000.). Consequently, a problem occurs with the method of performing the partial pressure control by determining the control valve in accordance with a predetermined value. The problem is that in the event that the theoretical ratio is not 1:1 but has become, for example, 2:1 or 1:2, the threshold value has to be set in units of the device (in units of the ratio of the shower plate), versatility is impaired, as a problem.

In addition, when the threshold value is mistakenly set, a noncontrollable zone occurs as another problem. More specifically, for example, suppose that whereas the theoretical ratio of the shower plate is 2.000, the threshold value is mistakenly set to 1.000, the objective pressure ratio is set to 1.500. According to such setting, in a practical operation, the center-side valve has to be controlled, however, since the threshold value is set to 1.000, 1.500 is determined to be for the edge-side valve. In this event, the control can be performed within a range of the ratio to 1.918 with the edge-side valve closed 25%. However, 1.500 is smaller than 1.918, so that control shifts to the center-side control, thereby causing a noncontrollable event. Thus, whereas the edge side can be within the range to 1.918, since 1.500 is smaller than 1.918, there occurs the problem of causing the noncontrollable event even with the embodiment corresponding to claim 10.

To solve the first problem, the relative pressure control system according to the present invention comprises the following structures.

(1) A relative pressure control system comprises: a plurality of air operated valves of a normally open type that are connected to an operation gas pipeline supplied with an operation gas; pressure sensors that are series connected to the respective air operated valves and that detect output pressures of the respective air operated valves; a control device that controls operation pressures of the respective air operated valves in accordance with the pressures detected by the pressure sensors; and an interlock mechanism that connects to the control device and that correlates the plurality of air operated valves to one another so that at least one of the plurality of air operated valves is normally opened, wherein an opening of a specified one of the plurality of air operated valves is regulated, and the operation gas is output at a predetermined division ratio.

(2) In the relative pressure control system set forth in (1), the control device performs a comparison between output pressures and specifies one of the plurality of air operated valves as a control objective.

(3) The relative pressure control system set forth in (1), further comprises abnormality detecting means, wherein when the operation gas is supplied by fully opening all the air operated valves, output pressures of the respective air operated valves are detected by the pressure sensors at a fixed interval, and the abnormality detecting means determines whether a pressure ratio of the output pressures exceeds a specified value and detects an abnormality when the pressure ratio exceeds the specified value.

(4) In the relative pressure control system set forth in (1), the control device stores valve models that each determine an operation pressure of a specified one of the air operated valves for the pressure detected by the pressure sensor, and performs feed forward control of the specified one of the air operated valves by using the valve model.

(5) In the relative pressure control system set forth in (4), the control device corrects the operation pressure underwent the feed forward control, by using the pressure detected by the pressure sensor connecting to the air operated valve undergoing the feed forward control.

(6) A relative pressure control system comprises: an operation gas pipeline; proportional control means and fixed orifice means parallel connected to the operation gas pipeline, the proportional control means performing variable control of a flow path area for an operation gas, and the fixed orifice means performing invariable control of the flow path area for the operation gas; pressure sensors that each detects pressures and that are respectively connected to the proportional control means and the fixed orifice means; and a control device that performs proportional control of operation of the proportional control means in accordance with results of detection by the pressure sensors, thereby to perform control of output pressures of the proportional control means and the fixed orifice means.

Further, the relative flow control system according to the present invention comprises the following structures to solve the first problem.

(7) A relative flow control system, comprises: a flow control device including a flow control valve connecting to a gas supply source, and flowrate sensing means for detecting a flowrate being output by the flow control valve, thereby to control the flow control valve in accordance with the results of detection by the flowrate sensing means; the operation gas pipeline connecting to the flow control device; the relative pressure control system including a plurality of air operated valves of a normally open type that are parallel connected to the operation gas pipeline, pressure sensors that are series connected to the respective air operated valves and that detect output pressures of the respective air operated valves, a control device that controls operation pressures of the respective air operated valves in accordance with the pressures detected by the pressure sensors, and an interlock mechanism that connects to the control device and that correlates the plurality of air operated valves to one another so that at least one of the plurality of air operated valves is normally opened, wherein an opening of a specified one of the plurality of air operated valves is regulated, the operation gas is output at a predetermined division ratio; and abnormality detecting means wherein when the operation gas is supplied by fully opening all the air operated valves, output pressures of the respective air operated valves are detected by the pressure sensors at a fixed interval, and the abnormality detecting means determines whether a pressure ratio of the output pressures exceeds a specified value and detects an abnormality when the pressure ratio exceeds the specified value.

(8) In the relative flow control system set forth in (7), the control device stores valve models that each determine an operation pressure of a specified one of the air operated valves for the pressure detected by the pressure sensor, and performs feed forward control of the specified one of the air operated valves by using the valve model.

(9) In the relative flow control system set forth in (8), the control device corrects the operation pressure underwent the feed forward control, by using the pressure detected by the pressure sensor connecting to the air operated valve undergoing the feed forward control.

To solve the second problem, the relative pressure control system according to the present invention comprises the following structures.

(10) A relative pressure control system comprising variable orifice means capable of performing variable control of a plurality of flow path areas in parallel to a single controlled-fluid supply pipeline, pressure sensors respectively series connected to the variable orifice means, and control means that controls open and close operations of the variable orifice means, wherein the controlled fluid is output at a predetermined division ratio from the plurality of variable orifice means, wherein: the control means includes arithmetic sections that calculate respective objective pressures of the plurality of variable orifice means in accordance with the predetermined division ratio and the results of detection of the pressure sensors, and a signal processor section that creates control signals to be supplied to the plurality of variable orifice means in accordance with the objective pressures and that outputs the control signals to all the variable orifice means; and before outputting the signals, the signal processor section outputs fixed-opening signals that each maintain conductance of the plurality of the variable orifice means at a fixed amount.

(11) In the relative pressure control system set forth in (10), preferably, the fixed amount is in a range of from 65% or more to 95% or less of the conductance in a fully opened state.

To solve the third problem, the relative pressure control system according to the present invention comprises the following structures.

(12) A relative pressure control system comprising variable orifice means capable of performing variable control of a plurality of flow path areas in parallel to a single controlled-fluid supply pipeline, pressure sensors respectively series connected to the variable orifice means, and control means that controls open and close operations of the variable orifice means, wherein the controlled fluid is output at a predetermined division ratio from the plurality of variable orifice means, wherein: the control means includes arithmetic sections that normally calculate respective objective pressures of the plurality of variable orifice means in accordance with the predetermined division ratio and the results of detection of the pressure sensors, and a signal processor section that creates control signals to be supplied to the plurality of variable orifice means in accordance with the objective pressures and that normally outputs the control signals to all the variable orifice means.

(13) In the relative pressure control system set forth in (12), when the variable orifice means are of a normally open type, the signal processor section performs a comparison of an amount of operation in accordance with a difference between the objective pressure calculated by the arithmetic section in units of the variable orifice means and an output pressure detected by the pressure sensor; and the signal processor section creates a fixed-opening signal for one of the variable orifice means wherein the amount of operation is a minimum, and creates a control signal necessary for the output pressure to reach the objective pressure for the other variable orifice means.

(14) In the relative pressure control system set forth in (12), when the variable orifice means are of a normally closed type, the signal processor section performs a comparison of an amount of operation in accordance with a difference between the objective pressure calculated by the arithmetic section in units of the variable orifice means and an output pressure detected by the pressure sensor; and the signal processor section creates a fixed-opening signal for one of the variable orifice means wherein the amount of operation is a maximum, and creates, for the other variable orifice means, a control signal necessary for the output pressure to reach the objective pressure.

(15) In the relative pressure control system set forth in (12), preferably, the fixed amount is in a range of from 65% or more to 95% or less of the conductance in a fully opened state.

BRIEF SUMMARY OF THE INVENTION

The relative pressure control systems (1) to (6) and relative flow control systems (7) to (9) having the above-described configurations to solve the first problems have effects and advantages described herebelow.

When a flow control valve is opened, an operation gas is supplied from a flow control device to a relative pressure control system through an operation gas pipeline. The flow control valve corresponds to variable orifice means. The flow rate control device uses the flowrate sensing means to detect the flow rate of the operation gas being output from the flow control valve, and regulates the valve opening of the flow control valve in accordance with the detection result. As such, the operation gas is output to the operation gas pipeline at a fixed flow rate, and is divided and supplied to respective air operated valves of the relative pressure control system. In the relative pressure control system, the pressures of the operation gas output by the respective air operated valves are detected by respective pressure sensors. Then, an operation pressure being supplied to the each respective air operated valve is determined by the control device in accordance with the result of detection, thereby to regulate the valve opening of the each respective air operated valve.

Consequently, the operation gas is output with a predetermined pressure from the each respective air operated valve.

Suppose that the control device has entered a runaway state to the extent of not being able to recognize the operational state of the each respective air operated valve. In this case, the interlock mechanism operates to open at least one of the air operated valves. Accordingly, the operation gas in the operation gas pipeline flows downstream without being remained in the operation gas pipeline.

Consequently, according to the relative pressure control system and relative flow control system of the present invention, with the simple construction having the single flowline for flowing the operation gas, the etching gas can be accurately regulated for the pressure ratio and can be securely drained from the operating gas pipeline in case of emergency.

In this case, when, of the plurality of air operated valves, the one with a lower pressure is specified to be a control objective, the plurality of air operated valves can be controlled in an interactive compensatory manner.

The pressure detected by the each respective pressure sensor is applied for data of a valve model to obtain the operation pressure that is exerted on the specified air operated valve, thereby to perform feed forward control of the open and close operations of the air operated valve. Consequently, the amount of control time for the air operated valve is reduced, and the processing capacity of the overall system can be enhanced.

Of course, a case can occur wherein the pressure being output from the air operated valve cannot be regulated to the objective value because the feed forward control determines the unique operation pressure. In this case, the air operated valve can be accurately regulated to the objective pressure by correcting the operation pressure for the air operated valve by using a pressure fed back from the pressure sensor.

The relative pressure control system and the relative flow control system include abnormality detecting means to verify whether the controlled state is constant.

When the operation gas is supplied in the state where all proportional control valves are fully opened, the output pressure of the each respective air operated valve is detected at a fixed interval by the pressure sensors, and then it is determined whether the pressure ratio exceeds a specified value. If the specified value is exceeded, the conductance is not reproduced to be the same as in an initial state, and hence abnormality is likely to be occurring with high probability, so that operation is carried out to detect such abnormality. Thereby, the relative flow control system and the relative pressure control system are enabled to quickly detect failure with components such as the operation gas pipeline.

The following briefs effects of the relative pressure control system using the proportional control means and the fixed orifice means. When an operation gas flowing through the same flowline is supplied to the proportional control means and the fixed orifice means, the operation gas is output from the proportional control means and the fixed orifice means. Output pressures of the proportional control means and the fixed orifice means are detected by the pressure sensors, and the valve openings of the proportional control means are regulated in accordance with the results of detection. Thereby, the output pressures of the fixed orifice means are relatively varied, and the operation gas is then output at a predetermined division ratio from the proportional control means and the fixed orifice means.

Suppose that the controller has entered a runaway state to the extent of not being able to recognize the operational state of the proportional control means. In this case, the operation gas from the operation gas pipeline flows downstream from the fixed orifice means without being remained in the operation gas pipeline.

Consequently, according to the relative flow control system of the present invention, with the simple construction having the single flowline for flowing the operation gas, the operation gas can be accurately regulated for the pressure ratio and can be securely drained from the operating gas pipeline in case of emergency. Further, cost reduction can be implemented by reducing the number of components, such as the proportional control means and hard-interlock mechanism.

The relative pressure control systems (10) and (11) for solving the second problems have effects and advantages as described herebelow.

As pointed out in conjunction with the second problems, when control-objective variable orifice means (valve) is determined by determining the threshold value in accordance with the theoretical ratio of the shower plate (for example, in the case where the theoretical ratio is the pressure ratio of 1.000, and the threshold value is 1.000), the noncontrollable zone is developed due to a variety of variations.

However, according to the present invention, the valves on both sides are closed by the fixed amount, and the pressure control is then performed. As such, suppose that, when the threshold value is determined and the control objective valve is then determined in accordance with the theoretical ratio of the shower plate (for example, in the case where the theoretical ratio is the pressure ratio of 1.000, and the threshold value is 1.000). Even in this case, since the valve on the one side is closed by the fixed opening, the control range is substantially widened for the valve being controlled, thereby to enable precluding a noncontrollable zone.

Thus, according to the case where the fixed-opening closing amount is set to sufficiently include such a noncontrollable zone, even when the control objective valve is determined by determining the threshold value, the control can be performed without problems.

The relative pressure control systems (12) to (15) having the above-described configuration to solve the third problems have effects and advantages as described herebelow.

Output pressures of the respective variable orifice means are input from the pressure sensors, and respective objective pressures to be output from the respective fluid control valves are normally calculated in accordance with a predetermined division ratio and the output pressures of the fluid control valves. Then, control signals necessary for the respective fluid control valves to output the controlled fluid at the objective pressures are created, and the created control signals are normally supplied to respective ones of the plurality of fluid control valves. Thereby, the plurality of fluid control valves are controlled. Thus, according to the present invention, with the control signals being supplied to the plurality of fluid control valves, the control can be implemented at any division ratio, so that a control objective valve need not be determined by determining a threshold value in accordance with the theoretical ratio of the shower plate. Thus, the plurality of fluid control valves are normally controlled to thereby control the controlled fluid, the controlled fluid can be output at a predetermined division ratio from the plurality of fluid control valves, and a noncontrollable zone can be precluded.

Suppose that normally open fluid control valves are used as the plurality of fluid control valves. In this case, in the event that the control is performed by normally supplying the control signals to the valves, since the valve openings of the respective fluid control valves are regulated, there can occur a case where the pressure on the upstream sides of the fluid control valves is increased. In this event, particular flow rate control of the fluid control valve that regulates the flow rate and composition of the controlled fluid is probably influenced. As such, in a case where the increase in the pressure on the upstream sides of the fluid control valves is undesired, the operation can be arranged as follows. The amounts of operation calculated by the arithmetic sections in units of the fluid control valve are compared with one another. As a result, a control signal causing the opening to be the fixed opening is supplied to the fluid control valve with a minimum amount of operation to thereby perform control in the fixed-amount closing direction. Concurrently, an operation pressure necessary for the output pressure to reach the objective pressure ratio is supplied to the other fluid control valve. Thereby, the valve openings are regulated. In this manner, the fluid control valve not specified as the control objective is securely controlled to the fixed opening, normally optimal conductance can be maintained, and the increase in the pressure on the upstream sides of the fluid control valves can be restrained.

Alternatively, suppose that normally closed fluid control valves are used as the plurality of fluid control valves. In this case also, similarly as in the case that the normally open fluid control valves are used, since the valve openings of the respective fluid control valves are regulated, there can occur a case where the pressure on the upstream sides of the fluid control valves is increased. In this event, particular flow rate control of the fluid control valve that regulates the flow rate and composition of the controlled fluid is probably influenced. As such, in a case where increase in the pressure on the upstream sides of the normally closed fluid control valves is undesired, the operation can be arranged as follows. The amounts of operation calculated by the arithmetic sections in units of the fluid control valve are compared with one another. As a result, a control signal causing the opening to be the fixed opening is supplied to the fluid control valve with a maximum amount of operation to thereby perform control in the fixed-amount closing direction. Concurrently, an operation pressure necessary for the output pressure to reach the objective pressure ratio is supplied to the other fluid control valve. Thereby, the valve openings are regulated. In this manner, the fluid control valve not specified as the control objective is securely controlled to the fixed opening, normally optimal conductance can be maintained, and the increase in the pressure on the upstream sides of the fluid control valves can be restrained.

BRIEF DESCRIPTION OF THE DRAWINGS

In the accompanying drawings:

FIG. 10 is a schematic diagram of an overall configuration of a relative flow control system according to a third embodiment of the present invention;

DETAILED DESCRIPTION OF THE PREFERRED EMBODIMENTS

Practical embodiments of the present invention will be described below.

First Embodiment

Figure 2:
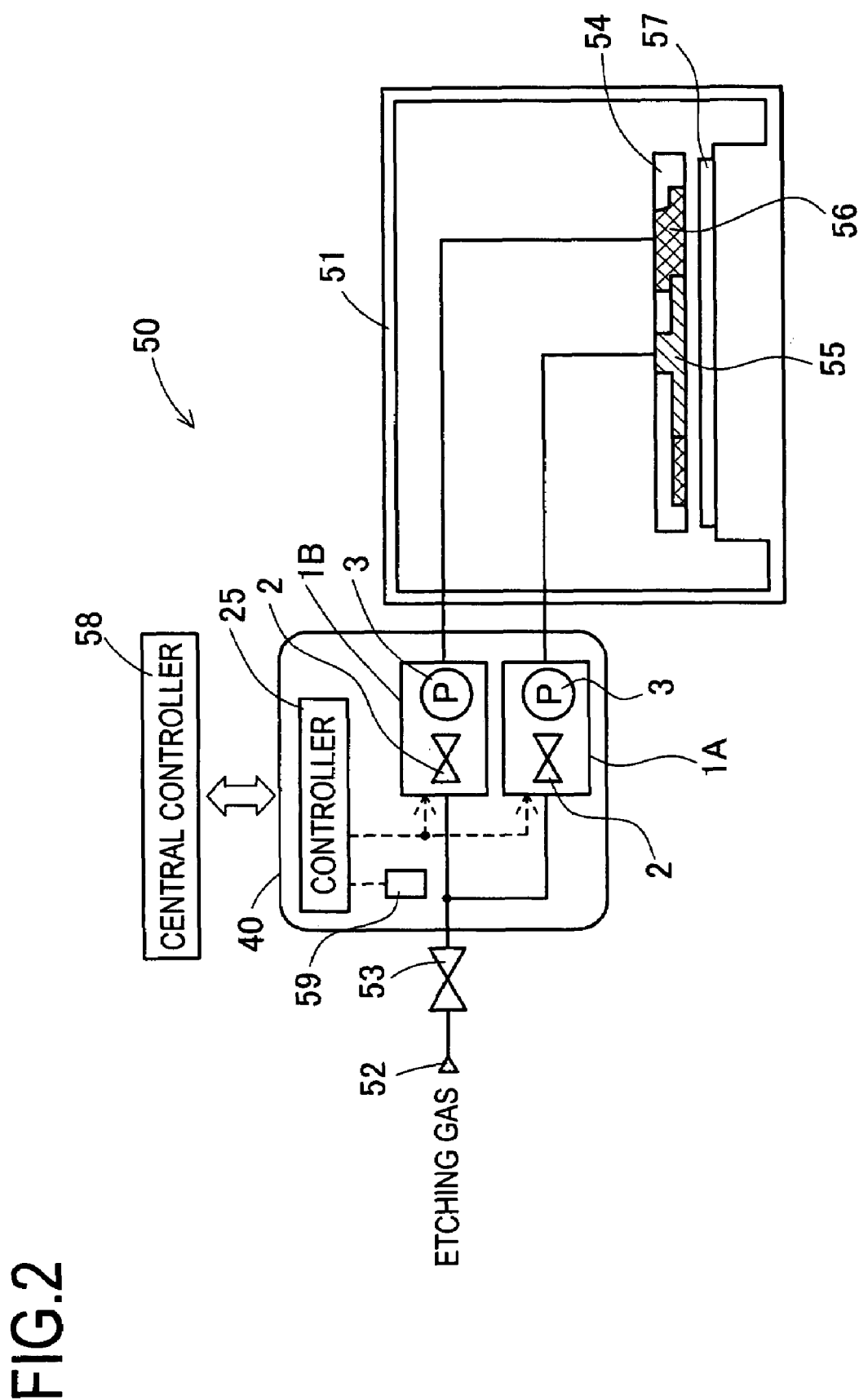
FIG. 2 is a schematic diagram of an overall configuration of an etching gas supply system according to the first embodiment.

To begin with, a first embodiment of the present invention will be described herebelow with reference to the drawings. FIG. 2 is a schematic diagram of an overall configuration of an etching gas supply system 50.

The etching gas supply system 50 includes a chamber 51 that is used to perform etching. A supply source 52 of the etching gas is connected through a gas supply valve 53 and a relative pressure control system 40 to an etching shower 54 disposed in the chamber 51. The etching shower 54 is disposed above one wafer 57 placed in the chamber 51, and an edge shower 56 is provided around a center shower 55.

The relative pressure control system 40 includes a pressure control device 1A connected to the center shower 55, and a pressure control device 1B connected to the edge shower 56. The pressure control devices 1A and 1B each include a pneumatic pressure control valve 2 and a pressure sensor 3, and are respectively connected to a controller 25 (each corresponding to a "control device" of a "relative pressure control system"). Either one of the pressure control devices 1A and 1B undergoes output control in accordance with the result of detection by the pressure sensor 3. The controller 25 is connected with a central controller 58 that controls the total operation of a semiconductor manufacturing system, whereby the flow rate control status of the etching gas is all time ("normally," hereafter) controlled. The controller 25 is further connected with a hard-interlock solenoid valve 59 (corresponding to an "interlock mechanism").

Figure 3:
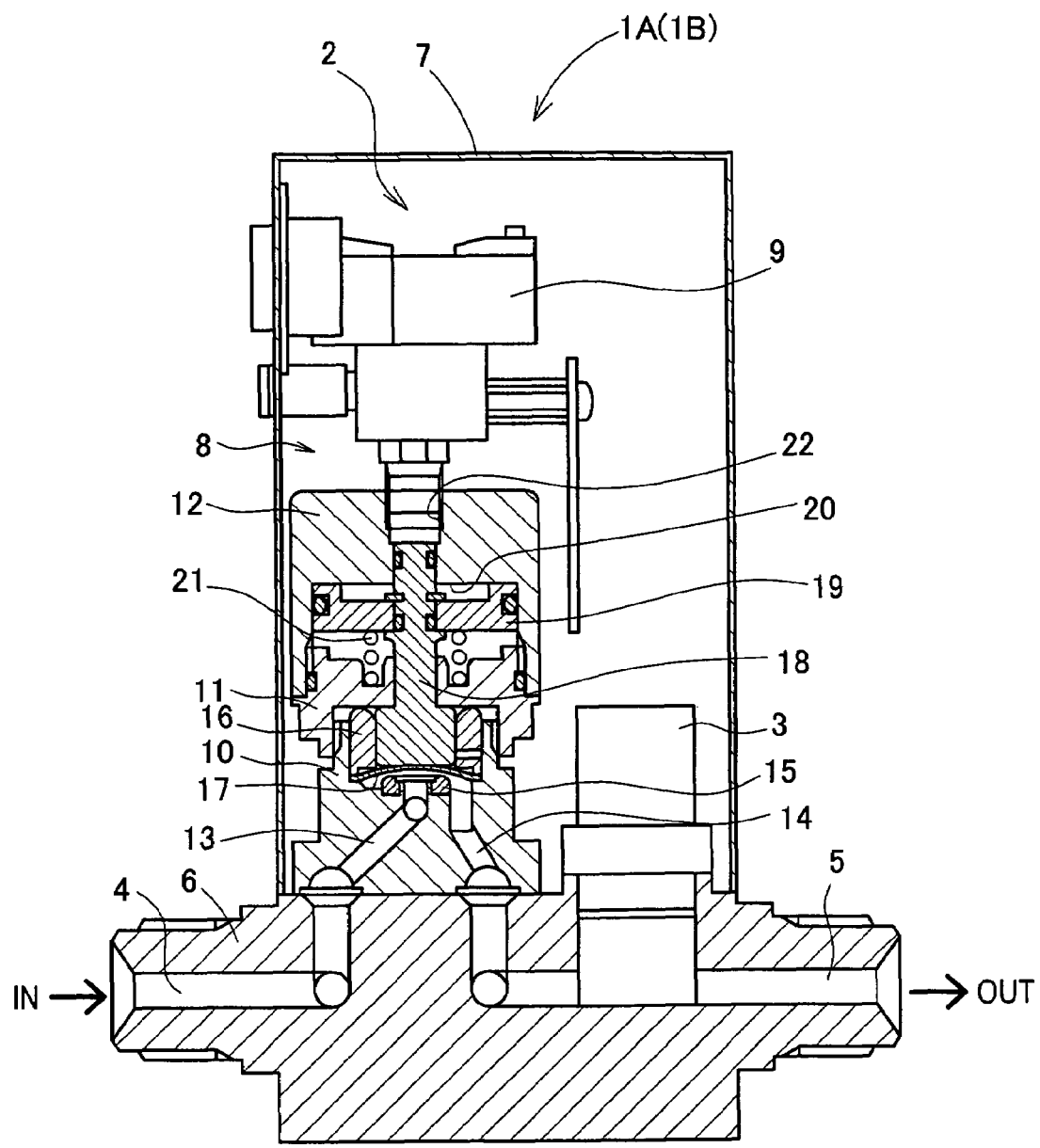
FIG. 3 is a local sectional view of a pressure control device used in the relative pressure control system according to the first embodiment of the present invention.

FIG. 3 is a local sectional view of the pressure control device 1A (or 1B) used in the relative pressure control system 40.

The pressure control device 1A (or 1B) includes a body 6 wherein an input port 4 and an output port 5 are formed. The pneumatic pressure control valve 2 is mounted to the body 6 to permit intercommunication between the input port 4 and the output port 5. The pressure sensor 3 is mounted on the output port 5 of the body 6, and the pneumatic pressure control valve 2 and the pressure sensor 3 are enclosed by a cover 7.

The pneumatic pressure control valve 2 configured such that an electropneumatic regulator 9 is coupled to a normally open air operated valve 8. The air operated valve 8 has an exterior configured of a flowpath block 10, an inbetween block 11, and a cover 12, and incorporates a valving portion for performing flow rate regulation of the etching gas, and an operation portion for operating the valving portion.

The valving portion is provided between the flowpath block 10 and the inbetween block 11. The flowpath block 10 is provided with a valve seat 15 that permits communication between an input flow path 13, which is connected to the input port 4 of the body 6, and an output flow path 14, which is connected to the output port 5 of the body 6. A diaphragm holder 16 is disposed between the flowpath block 10 and the inbetween block 11, and an outer peripheral portion of a diaphragm 17 is clamped between the diaphragm holder 16 and the flowpath block 10. The diaphragm 17 is disposed in such a manner as to be upwardly arcuate, and is spaced away from the valve seat 15. As such, the input port 4 of the body 6 communicates with the output port 5 of the body 6 through the input flow path 13 of the flowpath block 10, a valve chamber partitioned by the valve seat 15 and the diaphragm 17, and the output flow path 14 of the flowpath block 10.

The operation portion is provided between the inbetween block 11 and the cover 12. A valve shaft 18 is inserted through the cover 12 and the inbetween block 11 to abut on an upper surface of the diaphragm 17. A piston 19 is coupled with the valve shaft 18. The piston 19 is slidably disposed in a piston chamber 20 formed between the inbetween block 11 and the cover 12, thereby to separate the piston chamber 20 into an upper chamber and a lower chamber. A return spring 21 is disposed in the lower chamber of the piston chamber 20, thereby to exert upward forces to the valve shaft 18 through the piston 19. The upper chamber of the piston chamber 20 is formed in communication with an operation port 22 of the cover 12 through a flow path formed in an upper end portion of the valve shaft 18. The electropneumatic regulator 9 is connected to the operation port 22, thereby to control compressed air being supplied to the upper chamber of the piston chamber 20. By using a pressure difference between pressures in the upper chamber and lower chamber of the piston chamber 20, the valve shaft 18 is moved vertically (in the upper and lower directions), thereby enabling it to move the diaphragm 17 to abut on or detach from the valve seat 15.

Figure 4:
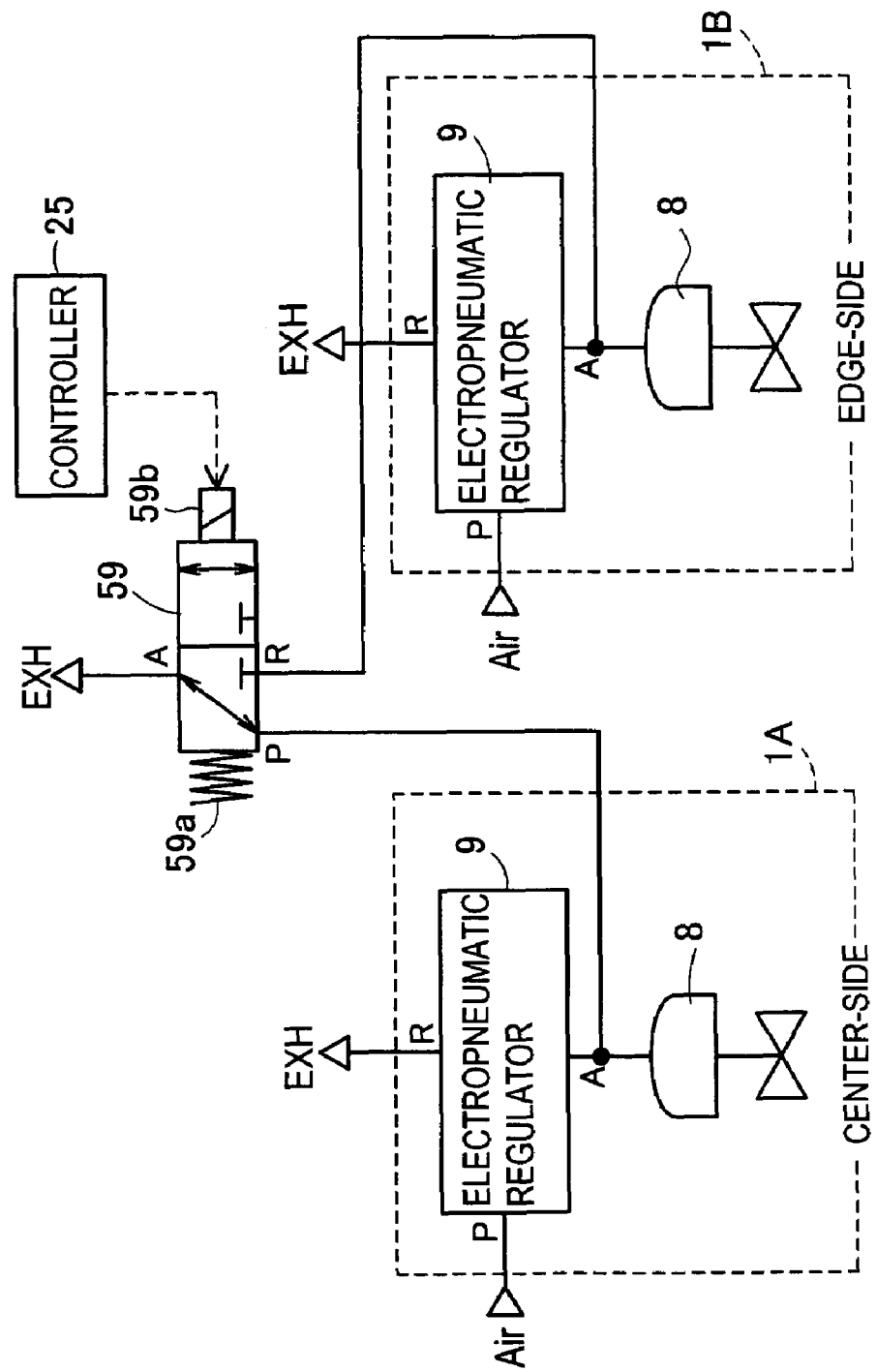
FIG. 4 is a circuit diagram of the relative pressure control system according to the first embodiment.

FIG. 4 is a circuit diagram of the relative pressure control system.

The hard-interlock solenoid valve 59 includes a port A connected to an exhaust outlet, a port P connected to the air operated valve 8 of the pressure control device 1A, and a port R tap connected to the air operated valve 8 of the pressure control device 1B. In addition, the hard-interlock solenoid valve 59 incorporates a valving mechanism that performs port shifting in accordance with an electric signal supplied from the controller 25. The valving mechanism is normally urged by a spring 59a in one way to thereby bring the ports A and P into intercommunication. However, when an electromagnet 59b is electrically energized (simply "energized," hereafter) and thereby attracts a plunger (not shown), the valving mechanism moves against urging forces of the spring 59a. Thereby, the ports A and R are brought into intercommunication. Accordingly, the air operated valves 8 of the pressure control devices 1A and 1B are associated with one another so that at least one of them is normally opened by the hard-interlock solenoid valve 59. The hard-interlock solenoid valve 59 controlled to connect the air operated valve 8, of which flow rate is not regulated by the controller 25, to the exhaust outlet.

Figure 1:
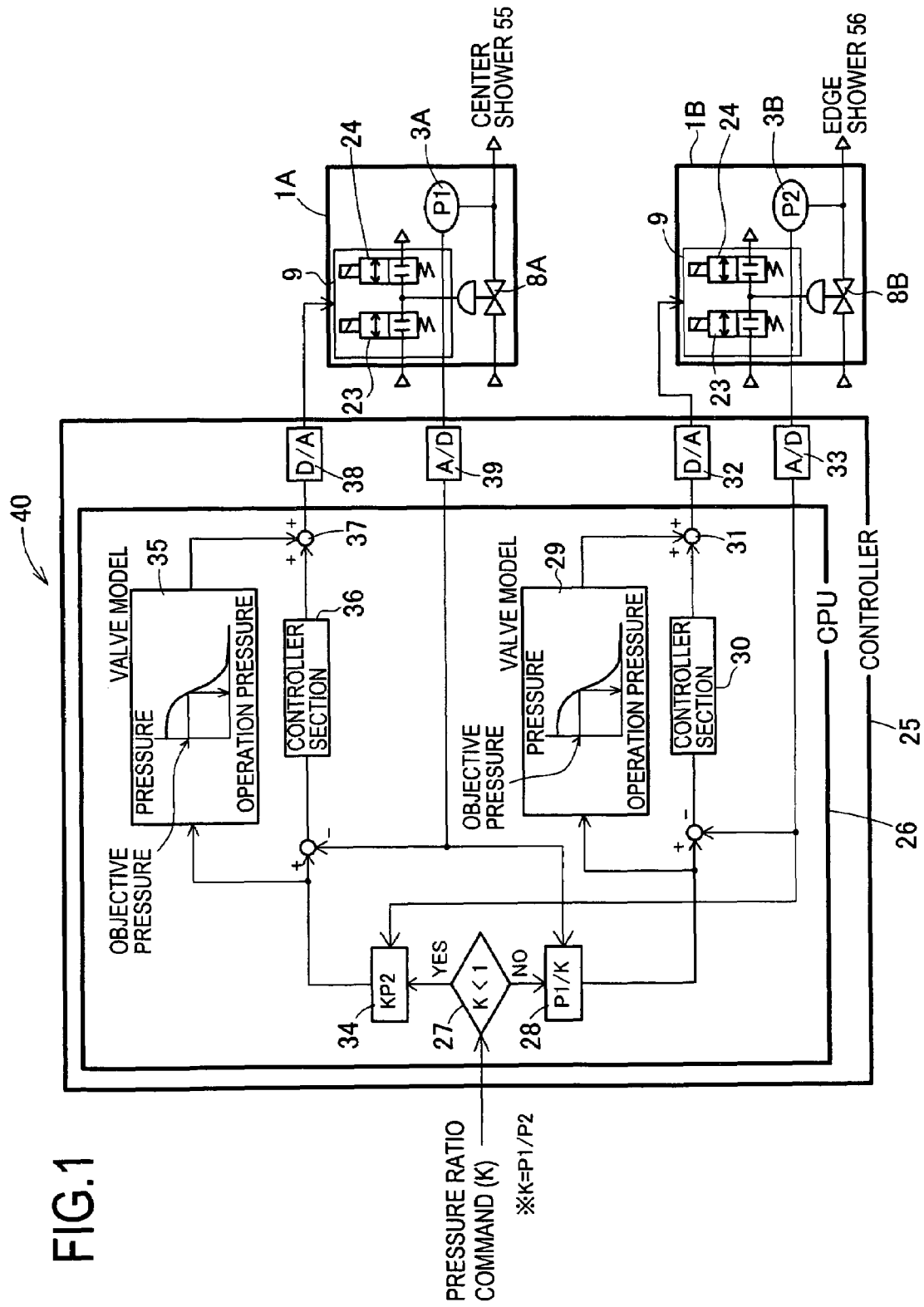
FIG. 1 is a block diagram of a relative pressure control system according to a first embodiment of the invention.

FIG. 1 is a block diagram of the relative pressure control system 40.

The controller 25 of the relative pressure control system 40 is connected to a supply valve 23 and exhaust valve 24 of the electropneumatic regulator 9 incorporated in each of the respective pressure control devices 1A and 1B. Thereby, open and close operations of the supply valve 23 and the exhaust valve 24 are controlled to perform opening regulation of the respective air operated valve 8.

The controller 25 includes a central processing unit 26 ("CPU," hereafter). This CPU 26 is a standard CPU, not a dual core CPU The CPU 26 includes a control objective determination section 27 that inputs an arbitrary pressure ratio command K (K=P1/P2, in the present case) and determines a control objective. Arithmetic sections 28 and 34 are parallel connected to the control objective determination section 27. The arithmetic section 28 calculates an arithmetic operation of an objective pressure P2 (=P1/K) on the side of the pressure control device 1B in accordance with the pressure ratio command K. The arithmetic section 34 calculates an objective pressure P1 (=KP2) on the side of the pressure control device 1A in accordance with the pressure ratio command K.

A valve model section 29 and a controller section 30 are parallel connected to the arithmetic section 28. The valve model section 29 stores a valve model having a predetermined operation pressure for controlling a pressure P2 to an objective value, wherein the pressure P2 is output from the air operated valve 8 of the pressure control device 1B in accordance with the objective pressure P2 (=P1/K), which is input from the arithmetic section 28, on the side of pressure control device 1B. The controller section 30 determines an operation pressure in accordance with the difference between the pressure P2 fed back from the pressure sensor 3 of the pressure control device 1B and the objective pressure P2 (=P1/K), which has been input from the arithmetic section 28, on the side of the pressure control device 1B. The valve model section 29 and the controller section 30 are connected together at a summing point 31, and are connected to the electropneumatic regulator 9 of the pressure control device 1B through a D/A converter 32. The pressure sensor 3 of the pressure control device 1B is connected to the arithmetic section 34 through an A/D converter 33, and is feedback connected to the upstream side of the controller section 30.

A valve model section 35 and a controller section 36 are parallel connected to the arithmetic section 34. The valve model section 35 stores a valve model having a predetermined operation pressure for controlling an objective pressure P1 to an objective value, wherein the pressure P1 is output from the air operated valve 8 of the pressure control device 1A in accordance with the objective pressure P1 (=KP2) on the side of pressure control device 1A. The controller section 36 determines an operation pressure in accordance with the difference between the pressure P1 fed back from the pressure sensor 3 of the pressure control device 1A and the objective pressure P1 (=KP2), which has been input from the arithmetic section 34, on the side of the pressure control device 1A. The valve model 35 and the controller section 36 are connected together at a summing point 37, and are connected to the electropneumatic regulator 9 of the pressure control device 1A through a D/A converter 38. The pressure sensor 3 is connected to the arithmetic section 28 through an A/D converter 39, and is feedback connected to the upstream side of the controller section 36.

The relative pressure control system 40 thus configured performs operation as described herebelow. In the event that, in the etching gas supply system 50 of FIG. 2, the gas supply valve 53 is closed and the etching gas is thereby stopped, a stop signal is input to the CPU 26 of the controller 25 shown in FIG. 1. In response to the stop signal, the CPU 26 stops the operation of the electropneumatic regulator 9 of the pressure control device 1A, 1B via the D/A converter 32, 38. Accordingly, the air operated valve 8 of the pressure control device 1A, 1B is not at all supplied with compressed air, so that the air operated valve 8 is open.

The following will describe a case where the gas supply valve 53 is opened in the etching gas supply system 50 shown in FIG. 2. When the gas supply valve 53 is opened, the etching gas is divided and supplied to the pressure control devices 1A and 1B. In the pressure control device 1A, 1B, since the air operated valve 8 is fully open, the etching gas is led to travel past the air operated valve 8 of the pressure control device 1A, 1B, and is then supplied to the wafer 57 from the center shower 55 and the edge shower 56.

With the pressure sensor 3 of the pressure control device 1A, the pressure P1 of the etching gas being output from the air operated valve 8 is detected, is output to the arithmetic section 28 of the CPU 26 through the A/D converter 39, and is then fed back to the controller section 36.

Similarly, with the pressure sensor 3 of the pressure control device 1B, the pressure P2 of the etching gas being output from the air operated valve 8 is detected is output to the arithmetic section 28 of the CPU 26 through the A/D converter 33, and is then fed back to the controller section 30.

In the CPU 26, an arbitrary pressure ratio command K (K=P1/P2, in the present case) is input, and it is determined whether the value of the pressure ratio command K is smaller than "1." If the value of the pressure ratio command K is smaller than "1," that is, the pressure P2 on the side of the pressure control device 1B is greater than the pressure P1 on the side of the pressure control device 1A, then the air operated valve 8 of the pressure control device 1A is determined to be a control objective. Then, the control of the air operated valve 8 of the pressure control device 1A is instantly started. In this event, since the air operated valve 8 of the pressure control device 1B is fully opened, the pressure P2 on the side of the pressure control device 1B increases. Then, the CPU 26 monitors the pressure P2 of the pressure control device 1B on the other side, and controls the air operated valve 8 of the pressure control device 1A to cause the pressure ratio to be a specified value. More particularly, the controller section 36 of the CPU 26 determines the operation pressure for the air operated valve 8 of the pressure control device 1A so that the pressure P1 on the side of the pressure control device 1A and the pressure P2 on the side of the pressure control device 1B are set to a predetermined pressure ratio. In this case, the determination is made in accordance with the difference between the objective pressure P1 (=KP2) on the side of the pressure control device 1A and the pressure P1 fed back from the pressure sensor 3 of the pressure control device 1A. Thereby, in the pressure control device 1A, the electropneumatic regulator 9 controls compressed air being supplied to the air operated valve 8, and opening regulation of the air operated valve 8 is carried out.

However, since the air operated valve 8 has low responsiveness, the control merely performed by the controller section 36 causes an operational retardation. In the controller 25, therefore, the arithmetic section 34 multiplies the value of the pressure ratio command K with the pneumatic pressure control valve 2, which has been detected by the pressure sensor 3 of the pressure control device 1B, to thereby obtain and supply the objective pressure P1 (=KP2) on the side of the pressure control device 1A to the valve model section 35. In the valve model section 35, the objective pressure P1 (=KP2) on the side of the pressure control device 1A is applied to data of the valve model, thereby to calculate the operation pressure that is used to set the pressure P1 on the side of the pressure control device 1A to an objective value in accordance with the data of the valve model. Thereby, in the pressure control device 1A, the electropneumatic regulator 9 controls the compressed air to cause the pressure P1, which is output from the air operated valve 8, to quickly reach the objective value, whereby the opening regulation of the air operated valve 8 is carried out.

In this event, since the interaction force of the controller section 36 is added at the summing point 37, the operation pressure is supplemented for the pressure that cannot be supplied with the valve model section 35. Consequently, the interaction force of the valve model section 35 is enabled to control the air operated valve 8 of the pressure control device 1A. The etching gas having a low pressure is output at a predetermined division ratio from the center shower 55 and the edge shower 56. Then, the etching gas is sprayed onto the entirety of the wafer 57.

During the above operation, the controller 25 performs control such that the hard-interlock solenoid valve 59 (see FIG. 4) is energized to thereby fully open the air operated valve 8 of the pressure control device 1B to the atmosphere. Concurrently, the air operated valve 8 of the pressure control device 1A is closed. This precludes possible occurrence of a case where the hard-interlock solenoid valve 59 influences the output regulation of the etching gas.

In the event that the value of the pressure ratio command K is not smaller than "1," that is, the pressure P1 on the side of the pressure control device 1A is greater than or equal to the pressure P2 on the side of the pressure control device 1B, control similar to the above-described case is carried out. In specific, the air operated valve 8 of the pressure control device 1B is controlled to cause the pressure P2 on the side of the pressure control device 1B to quickly reach the objective value, whereby the etching gas can be output at a predetermined division ratio to the center area and edge area of the wafer 57. In this case, however, the pressure P1 detected by the pressure sensor 3 of the pressure control device 1A is divided in the arithmetic section 28, and the resultant value (P1/K) is used for the objective pressure P2 on the side of the pressure control device 1B. During this operation, the controller 25 controls the etching gas supply system 50 to be in a deenergized state to thereby fully open the air operated valve 8 of the pressure control device 1A to the atmosphere. Concurrently, the air operated valve 8 of the pressure control device 1B is closed.

Figure 5:
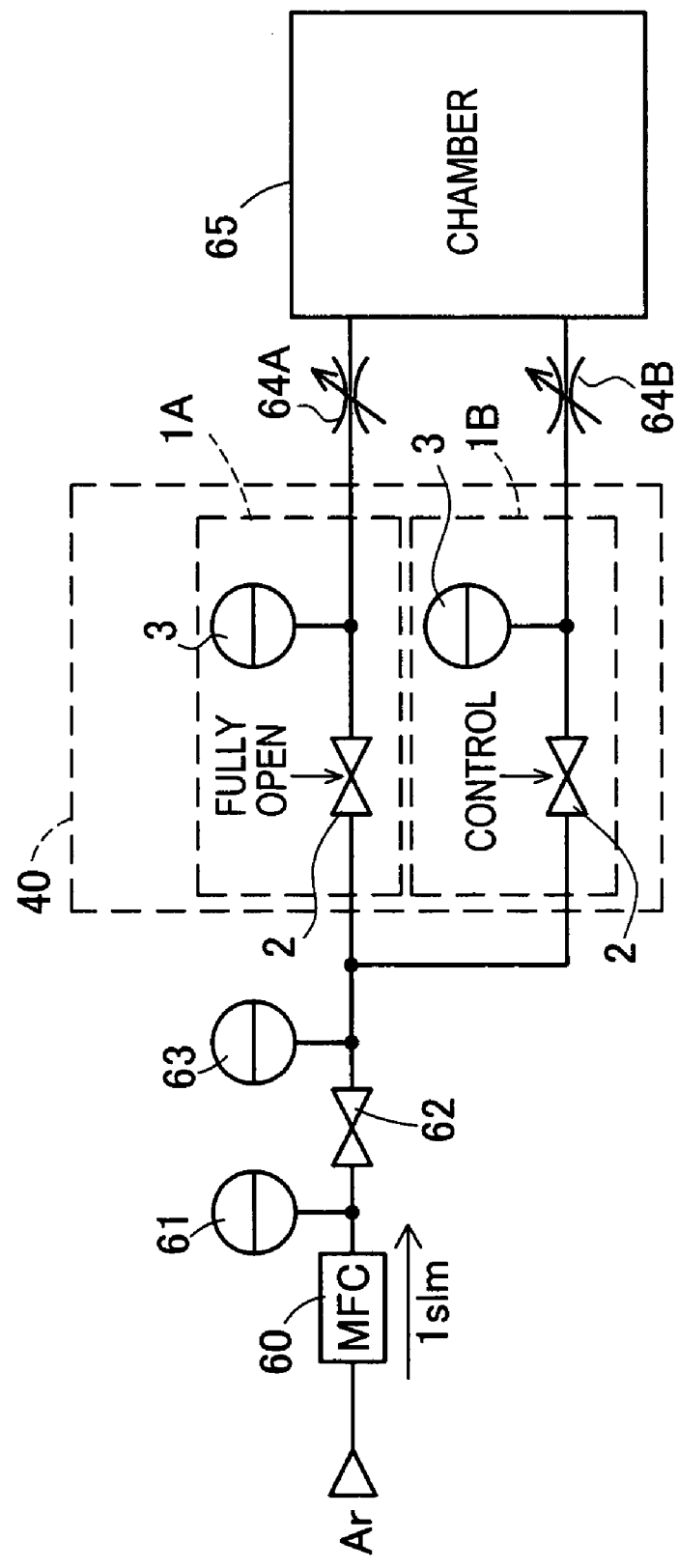
FIG. 5 is a test circuit diagram for checking effects of the relative pressure control system according to the first embodiment.

The inventors created a test circuit and perform experimentation therewith regarding advantages of the feed forward control of the air operated valve 8. FIG. 5 is a test circuit diagram for checking effects of the relative pressure control system 40.

The test circuit has series connected components including a mass flow controller 60 (MFC), a pressure sensor 61, an operating gas supply valve 62, and a pressure sensor 63. Pressure control devices 1A and 1B of a relative pressure control system 40 are parallel connected to the pressure sensor 63. The pressure control devices 1A and 1B each include a pneumatic pressure control valve 2 and a pressure sensor 3, and connect to a chamber 65 through respective nozzles 64A and 64B.

Figure 6:
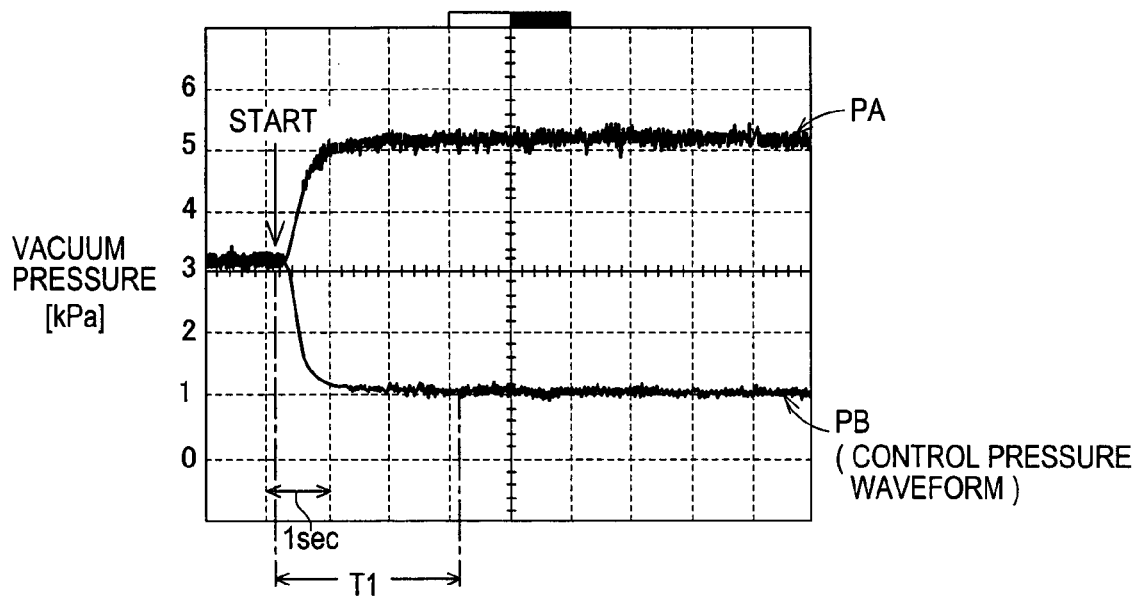
FIG. 6 is a diagram showing results of checking of the effects of the relative pressure control system in the event that feed forward control according to the first embodiment is not performed, wherein the vertical axis represents a vacuum pressure (kPa) and the horizontal axis represents the time (sec (seconds))
Figure 7:
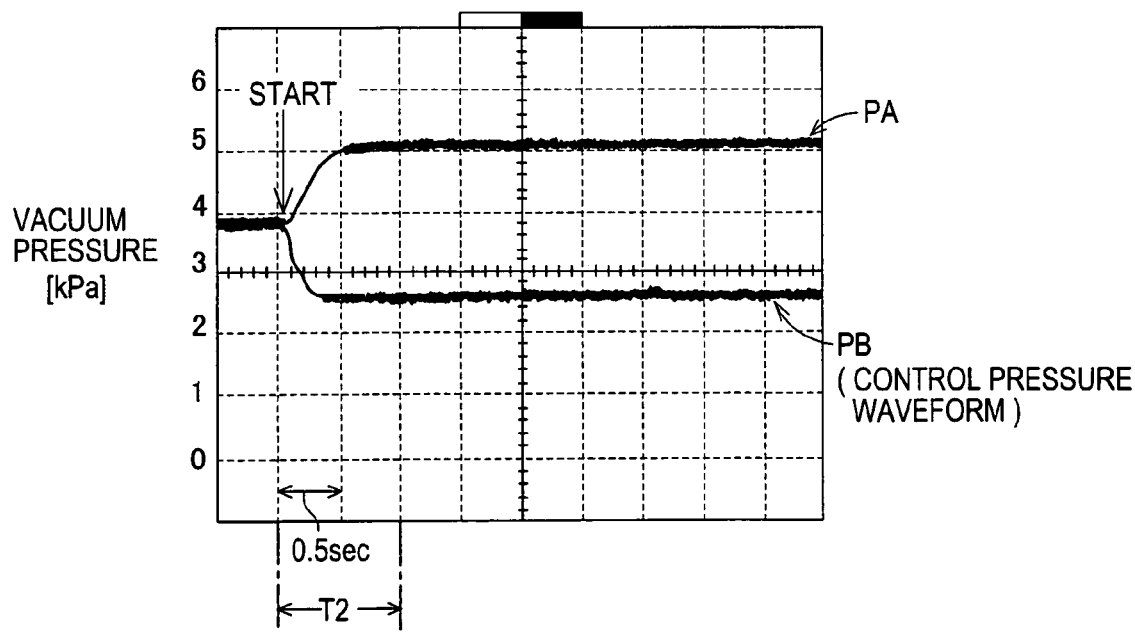
FIG. 7 is a diagram showing results of checking of the effects of the relative pressure control system in the event that the feed forward control according to the first embodiment has been performed, wherein the vertical axis represents the vacuum pressure (kPa) and the horizontal axis represents the time (sec)

In the experimentation (testing), argon supplied to the test circuit is made to flow by the MFC 60 at 1 L/min. With the air operated valve 8 of the pressure control device 1B being set as the control objective, the time was measured that took until a pressure PB being output from the air operated valve 8 of the pressure control device 1B settled into an objective value so that a pressure PA on the side of the fully-opened pressure control device 1A and the pressure PB on the side of the pressure control device 1B were set to a predetermined pressure ratio. FIG. 6 is a diagram showing results of checking of the effects of the relative pressure control system 40 in the event that feed forward control is not performed. In the diagram, the vertical axis represents a vacuum pressure (kPa) and the horizontal axis represents the time (sec). FIG. 7 is a diagram showing results of checking of the effects of the relative pressure control system 40 in the event that the feed forward control has been performed. In the drawing, the vertical axis represents the vacuum pressure (kPa) and the horizontal axis represents the time (sec).

As shown in FIG. 6, when the feed forward control of the air operated valve 8 of the pressure control device 1B is not performed, a time T1 necessary for the air operated valve 8 of the pressure control device 1B to settle the pressure PB into the objective value is about 3 sec.

In comparison, as shown in FIG. 7, when the feed forward control of the air operated valve 8 of the pressure control device 1B is performed, the time T1 necessary for the air operated valve 8 of the pressure control device 1B to settle the pressure PB into the objective value is about 1 sec.

Thus, the time necessary to settle the pressure PB was able to be reduced to about one third by the feed forward control of the air operated valve 8 of the pressure control device 1B.

As described above, according to the relative pressure control system 40 of the present embodiment, the etching gas flowing through the same flowline is supplied from the gas supply valve 53 to the respective air operated valve 8 of the pressure control devices 1A and 1B. Then, the etching gas is output from the respective air operated valve 8 of the pressure control device 1A, 1B. The pressures P1 and P2, respectively, of the respective air operated valves 8 are detected by the pressure sensors 3, and either of the air operated valves 8 for supplying the operation pressure is specified in accordance with the detection results. Then, the operation pressure to be supplied to the specified air operated valve 8 is determined, and the valve opening thereof is regulated, thereby to output the operating gas at the predetermined division ratio from the air operated valves 8 of the pressure control devices 1A and 1B.

A case is now assumed where the controller 25 has entered a runaway state to the extent of not being able to recognize the operational state of the each respective air operated valve 8. In this case, in the deenergized state, the hard-interlock solenoid valve 59 permits the ports A and P to communicate with one another to relieve the operation pressure of the air operated valve 8 of the pressure control device 1A through the exhaust outlet. Thereby, the air operated valve 8 of at least the pressure control device 1A is opened. On the other hand, when in the energized state, the hard-interlock solenoid valve 59 permits the ports A and R to communicate with one another to relieve the operation pressure of the air operated valve 8 of the pressure control device 1B through the exhaust outlet. Thereby, the operation pressure of the air operated valve 8 of at least the pressure control device 1B is opened. Accordingly, the etching gas in the operating gas pipeline, which connects between the gas supply valve 53 and the air operated valves 8 of the pressure control devices 1A and 1B, flows to the chamber 51 from the opened air operated valve 8. Consequently, the etching gas does not remain in the operating gas pipeline.

Thus, according to the relative pressure control system 40 of the present invention, with the simple construction having the single flowline for flowing the etching gas, the division ratio of the etching gas can be accurately regulated, and the gas can be securely drained from the operating gas pipeline in case of emergency.

Further, according to the relative pressure control system 40 of the present embodiment, of the air operated valves 8 of the pressure control devices 1A and 1B, the one with smaller one of the pressures P1 and P2 is specified to be the control objective (see FIG. 1). Consequently, the air operated valves 8 of the pressure control devices 1A and 1B can be controlled in an interactive compensatory manner.

Further, the relative pressure control system 40 of the present invention carries out the control as described hereinafter. In the event of the control of the pressure P1 being output from the side of the pressure control device 1A, the objective pressure P1 (=KP2) of the pressure control device 1A is calculated from the pressure P2 detected by the pressure control device 1B and the pressure ratio command K. Then, the objective pressure P1 (=KP2) is applied for the data of the valve model of the valve model section 35 to obtain the operation pressure of the pressure sensor 3 of the pressure control device 1A, thereby to perform the feed forward control of the open and close operations of the air operated valve 8 of the pressure control device 1A. On the other hand, in the event of control of the pressure P2 being output from the side of the pressure control device 1B, the objective pressure P2 (=P1/K) of the pressure control device 1B is calculated from the pressure P1 detected by the pressure control device 1A and the pressure ratio command K. Then, the objective pressure P2 (=P1/K) is applied for the data of the valve model of the valve model section 29 to obtain the operation pressure of the pressure sensor 3 of the pressure control device 1B, thereby to perform the feed forward control of the open and close operations of the air operated valve 8 of the pressure control device 1B (see FIG. 1). Consequently, the amount of control time is reduced, and the processing capacity of the overall system can be enhanced.

Further, according to the relative pressure control system 40, in the event that the pressure P1 being output from the air operated valve 8 of the pressure control device 1A cannot be regulated to the objective pressure P1 (=KP2) by the feed forward control, the operation pressure for the air operated valve 8 is compensated for by using the pressure P1 fed back from the pressure sensor 3 of the pressure control device 1A. On the other hand, in the event that the pressure P2 being output from the air operated valve 8 of the pressure control device 1B cannot be regulated to the objective pressure P2 (=P1/K) by the feed forward control, the operation pressure for the air operated valve 8 is compensated for by using the pressure P2 fed back from the pressure sensor 3 of the pressure control device 1B. Consequently, the air operated valve 8 of the pressure control device 1A, 1B can be accurately regulated to the objective pressure P1 (=KP2) or P2 (=P1/K).

The relative pressure control system 40 includes abnormality detecting means in the controller 25, thereby to verify whether the controlled state is constant. In specific, when, for example, terminating the partial pressure control of the operating gas or changing the type of the operating gas, the abnormality detecting means is operated to thereby perform abnormality detection of the operating gas pipeline and the like.

Figure 8:
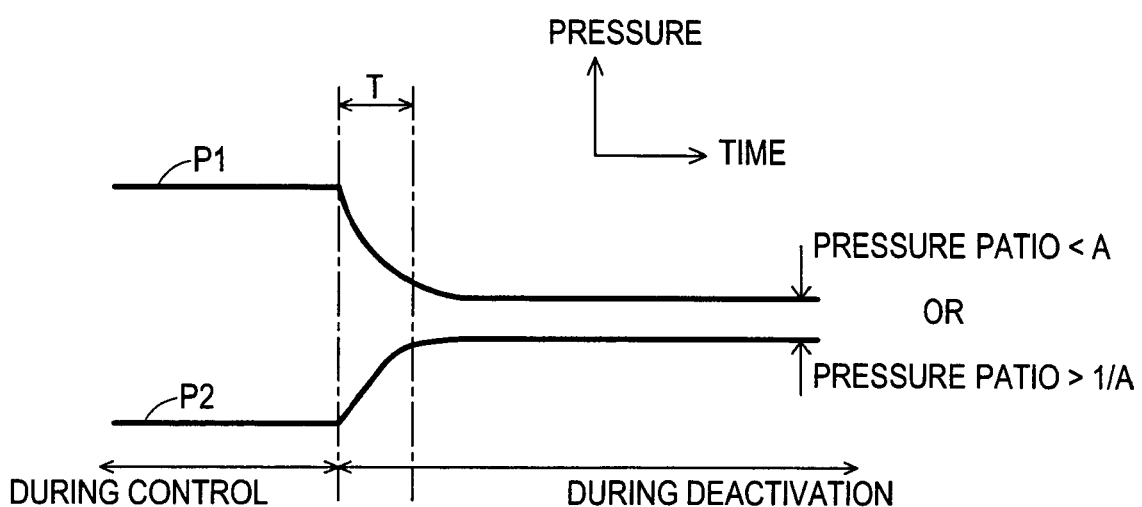
FIG. 8 is diagram showing one example of abnormality detection according to the first embodiment, wherein the vertical axis represents the pressure and the horizontal axis represents the time.

Before controlling the gas supply valve 53 to open the gas supply valve 53, the controller 25 terminates sending of the electrical energization to the electropneumatic regulator 9 of the pressure control device 1A, 1B, and controls the abnormality detecting means to operate. As shown in FIG. 8, after passage of a transient time T from the instance when the pressure sensors 3 of the pressure control devices 1A and 1B have terminated the energization to electropneumatic regulators 9 to the instance when the air operated valve 8 completely fully opens, pressures P1 and P2 that are detected every a fixed time interval (500 msec, for example) are input. Then, an output pressure P1 of the air operated valve 8 of the pressure control device 1A is divided by an output pressure P2 of the air operated valve 8 of the pressure control device 1B. In this manner, the controller 25 calculates a pressure ratio (P1/P2).

Then, it is determined whether the calculated pressure ratio exceeds a specified value. An example case is now assumed where the upper limit value of the specified value is A, and the lower limit value of the specified value is 1/A. In this case, if it is determined that the calculated pressure ratio (P1/P2) is greater than the upper limit value A of the specified value or is smaller than the lower limit value 1/A, it is considered that the conductance is not identical to that in the initial state, so that an abnormality is detected. Upon plural instances of the abnormality have been series counted (three instances, in the present embodiment), an alarm or the like is output to thereby notify an operator of the abnormality. The plural instances of abnormality detections are thus necessary to prevent an erroneous detection. In this manner, the etching gas supply system 50 and the relative pressure control system 40 are capable of quickly detecting failure with components such as the operating gas pipeline.

Second Embodiment

Figure 9:
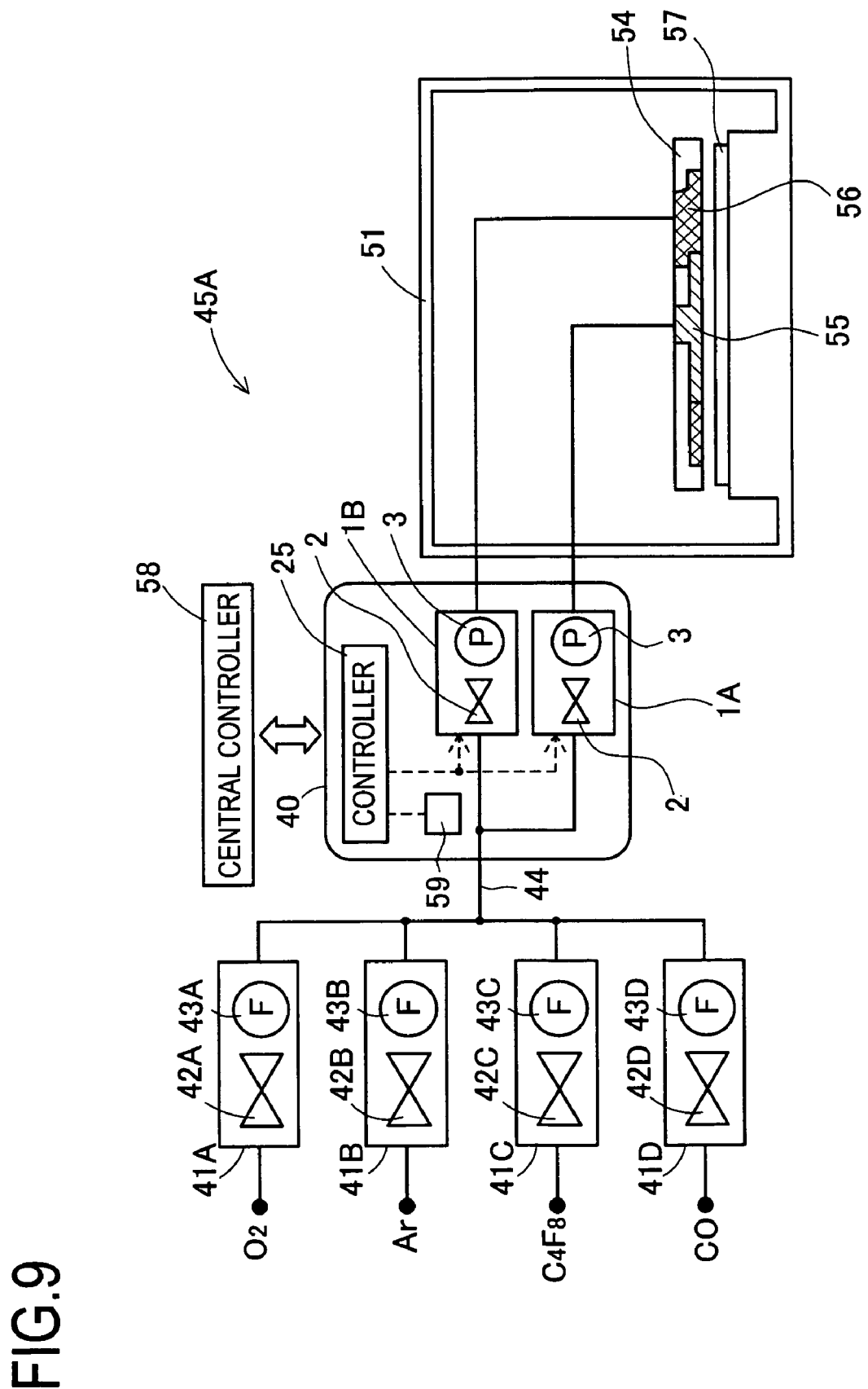
FIG. 9 is a schematic diagram of an overall configuration of a relative flow control system according to a second embodiment of the present invention.

A second embodiment of the present invention will be described herebelow with reference to the drawings. FIG. 9 is a schematic diagram of an overall configuration of a relative flow control system 45A.

The relative flow control system 45A of the present embodiment is used for an etching process of semiconductor manufacturing steps. The relative flow control system 45A is configured in the manner that a plurality of flow control devices 41A to 41D are connected to the relative pressure control system 40 of the first embodiment. The flow control devices 41A to 41D, respectively, are connected to operation gas supply sources of, for example, $O_2$, Ar, $C_4F_8$, and CO. The respective flow control devices 41A to 41D are configured such that flow control valves 42A to 42D for performing the flow rate regulation of the operation gas are series connected to flow rate sensors 43A to 43D (each corresponding to "flow rate sensing means"). The flow control devices 41A to 41D, respectively, control the flow control valves 42A to 42D in accordance with detection results of the flow rate sensors 43A to 43D.

Accordingly, in the relative flow control system 45A, when argon (Ar) is used as an operation gas, the flow rate control device 41B is operated to open the flow control valve 42B. When the flow rate sensor 43B is opened, the argon is supplied from the flow control valve 43B to an operation gas pipeline 44, the relative pressure control system 40, and the chamber 51. The flow rate control device 41B uses the flow rate sensor 43B to detect the flow rate of the operation gas being output from the flow control valve 42B, and regulates the valve opening of the flow control valve 42B in accordance with the detection result. As such, even when, for example, the conductance of the operation gas pipeline 44 has varied, the flow rate regulation of the operation gas is performed in correspondence with the variations. Consequently, the operation gas is normally output to the operation gas pipeline 44 at a fixed flow rate, and is divided and supplied to the pressure control devices 1A and 1B of the relative pressure control system 40. In the relative pressure control system 40, the respective pressure control device 1A, 1B uses the pressure sensor 3 to detect the output pressure of the respective air operated valve 8, and uses the controller 25 to determine the operation pressure being supplied to the respective air operated valve 8, thereby to regulate the valve opening of the respective air operated valve 8. Consequently, the operation gas is output with a predetermined pressure from the respective air operated valve 8 of the pressure control device 1A, 1B.

A case is herein assumed where the controller 25 has entered a runaway state to the extent of not being able to recognize the operational state of the each respective air operated valve 8. In this case, the hard-interlock solenoid valve 59 operates to open the air operated valve 8 of either of the pressure control devices 1A and 1B. The operation gas in the operation gas pipeline 44 flows from the opened air operated valve 8 to the chamber 51 without being remained in the operation gas pipeline 44.

Consequently, according to the relative flow control system 45A, with the simple construction having the single flowline for flowing the etching gas, the etching gas can be accurately regulated for the pressure ratio and can be securely drained from the operating gas pipeline 44 in case of emergency.

Third Embodiment

Figure 10:
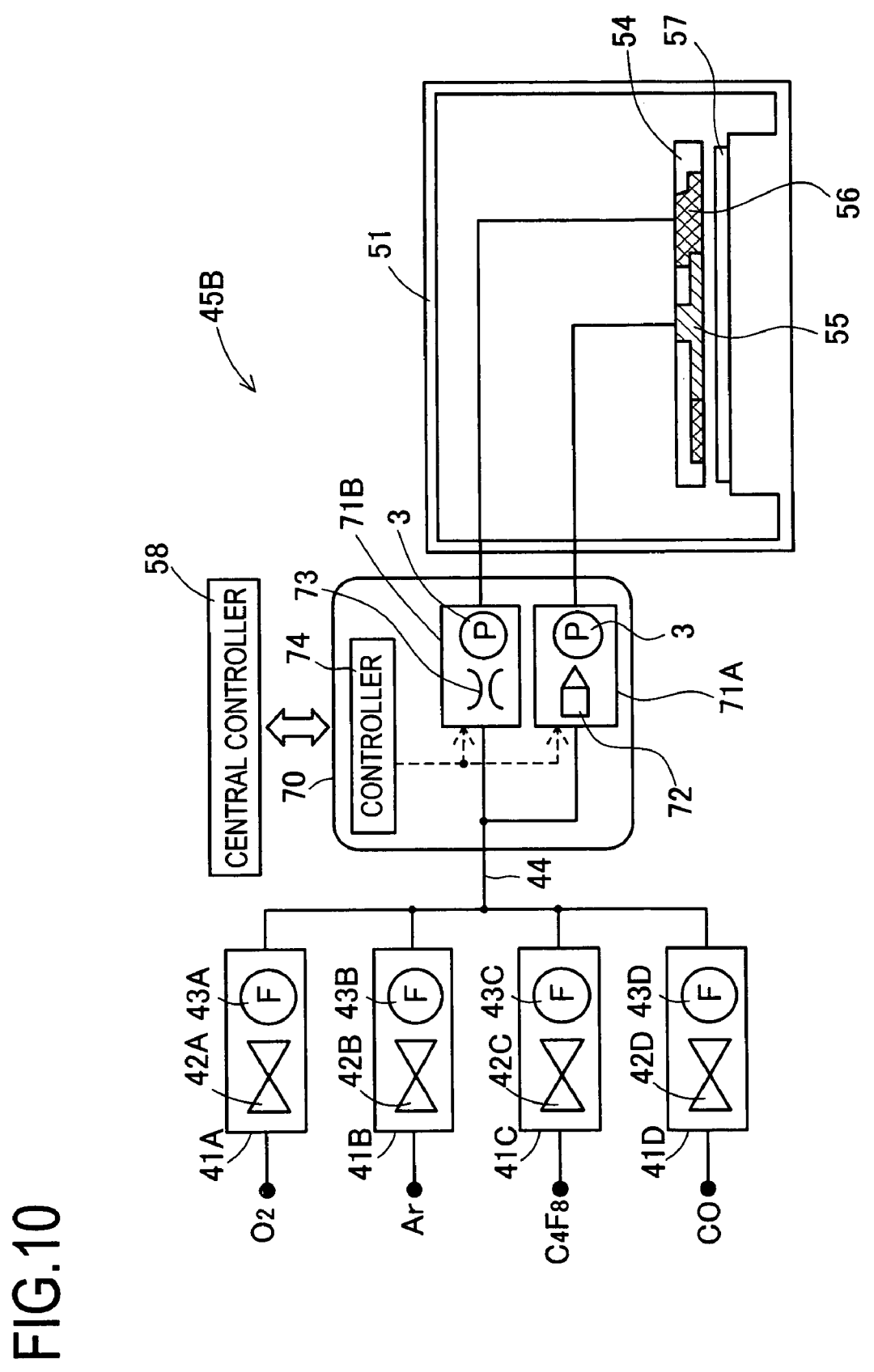

A third embodiment of the present invention will be described herebelow. FIG. 10 is a schematic diagram of an overall configuration of a relative flow control system 45B.

In the relative flow control system 45B of the present invention, a relative pressure control system 70 controls the division ratio by using a single piezo-electric valve 72 (corresponding to "proportional control means") and an orifice 73 (corresponding to "orifice means"). In these respects, the relative flow control system 45B is different from the relative pressure control system 40 of the first and second embodiments that controls the division ratio by using two air operated valves 8. The following will describe in detail portions different from the first and second embodiments, but omit description of portions common thereto. Portions common to the first and second embodiments are shown in the drawings with the same reference characters.

The relative pressure control system 70 is connected to the flow control devices 41A to 41D through the operation gas pipeline 44, and pressure control device 71A and a pressure control device 71B are parallel connected to the operation gas pipeline 44. The pressure control device 71A is configured such that the pressure sensor 3 is series connected to the piezo-electric valve 72 that performs variable control of the operation gas, and is connected to the center shower 55. The pressure control device 71B is configured such that the pressure sensor 3 is series connected to the orifice 73 that performs invariable control of the operation gas, and is connected to the edge shower 56. A Cv value of the orifice 73 is set within a Cv-value variable range of the piezo-electric valve 72 to secure a wide pressure variation range. In the present embodiment, the Cv value of the orifice 73 is set to half the Cv value of the piezo-electric valve 72.

The pressure control devices 71A and 71B are connected to a controller 74 (corresponding to a "control device"). Respective pressure ratios P3 and P4 being output by the piezo-electric valve 72 and the orifice 73 are detected using the pressure sensors 3, and proportional control of the piezo-electric valve 72 is performed in accordance with the detection results.

In the present embodiment, the operation gas pipeline 44 and the chamber 51 are provided to normally communicate with one another, such that the hard-interlock solenoid valve 59 is not provided.

In the relative pressure control system 70, when argon (Ar) is used as an operation gas, the flow rate control device 41B is operated. Then, the argon is regulated by the flow control valve 42B for the flow rate in accordance with the result of detection performed by the flow rate sensor 43B, and is supplied to the operation gas pipeline 44. The argon is divided from the operation gas pipeline 44 to the piezo-electric valve 72 and the orifice 73, and is then output to the chamber 51. Respective output pressures P3 and P4 of the piezo-electric valve 72 and the orifice 73 are detected by the pressure sensors 3, and the valve opening of the piezo-electric valve 72 is regulated in accordance with the detection results. Thereby, the output pressure of the orifice 73 is relatively varied, and the operation gas is output at a predetermined division ratio from the piezo-electric valve 72 and the orifice 73.

A case is herein assumed where the controller has entered a runaway state to the extent of not being able to recognize the operational state of the piezo-electric valve 72. In this case, the operation gas from the operation gas pipeline 44 flows downstream from the orifice 73, without being remained in the operation gas pipeline 44.

Consequently, according to the relative pressure control system 70 and relative flow control system 45B of the present invention, with the simple construction having the single flowline for flowing the etching gas, the etching gas can be accurately regulated for the pressure ratio and can be securely drained from the operating gas pipeline 44 in case of emergency. Further, cost reduction can be implemented by reducing the number of components, such as piezo-electric valves 72 and hard-interlock solenoid valves 59.

As above, the first to third embodiments of the present invention are described, however, the invention is not limited by the embodiments; rather the present invention can be adapted for various applications.

In the embodiments, the pressures of the etching gas being output from two air operated valves 8 are regulated into the value of pressure ratio command K, for example. However, the regulation may be carried out for a division ratio of the etching gas being output from three or more air operated valves 8.

In addition, the embodiments each use the relative pressure control system 40 for the etching gas supply system 50, for example. However, the application objective is not limited to such a semiconductor manufacturing system as long as being intended for outputting an operation gas at a predetermined division ratio.

Further, the embodiments each use a direct-operated three-port solenoid valve as the hard-interlock solenoid valve 59, for example. However, there is no limitation thereto, and a pilot three-port solenoid valve may instead be used, for example.

Further, the third embodiment uses the piezo-electric valve as the display control means, however, a valve of a different type, such as an air operated valve or solenoid valve may instead be used.

Fourth Embodiment

Figure 12:
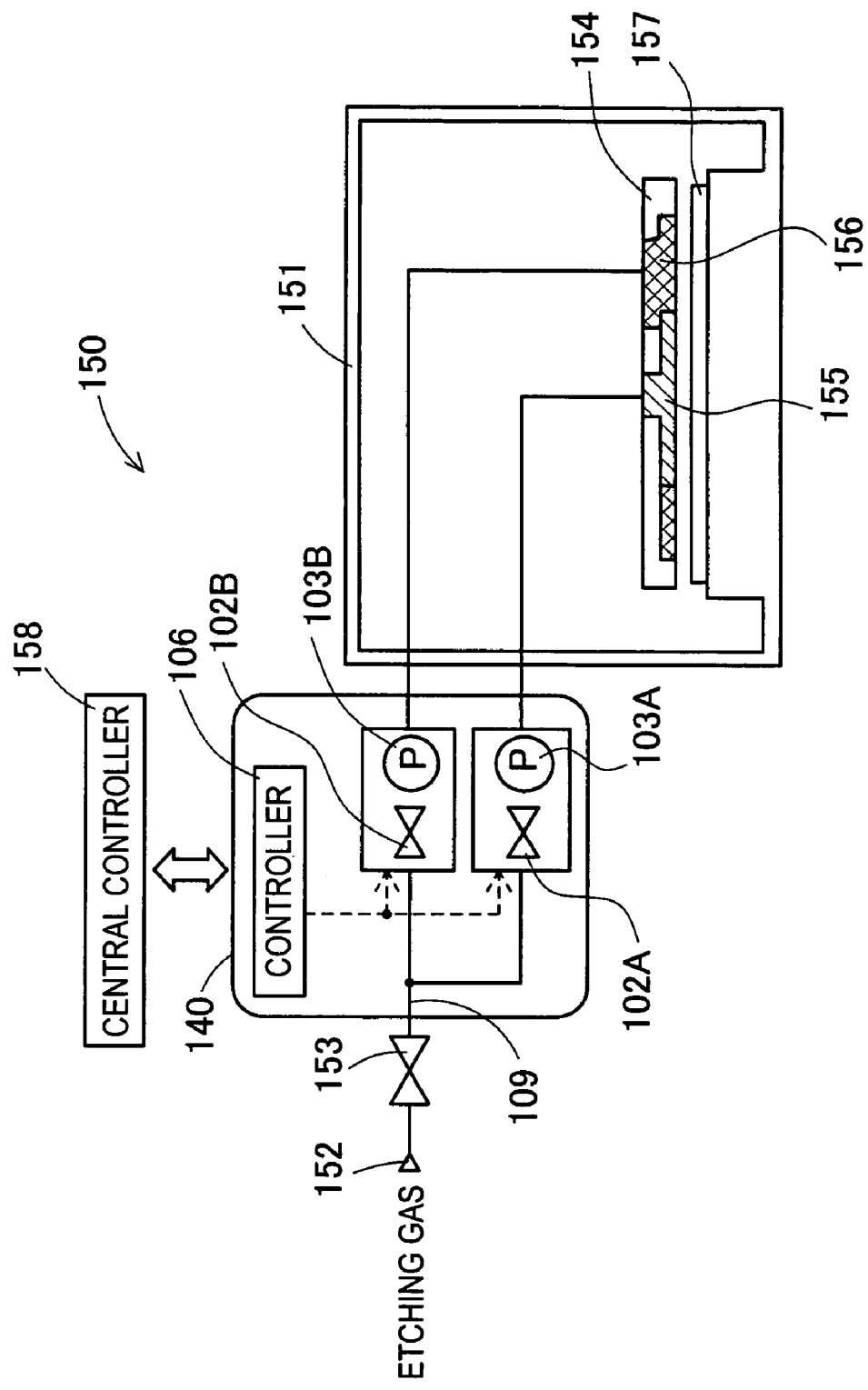
FIG. 12 is a schematic diagram of an overall configuration of the relative pressure control system according to the fourth embodiment.

A fourth embodiment of a relative pressure control system 140 according to the present invention will be described hereinbelow with reference to the drawings. Because the basic configuration is identical to the configuration of the first embodiment shown in FIG. 1, descriptions of the same portions will be omitted herefrom. FIG. 12 is a schematic diagram of an overall configuration of the relative pressure control system.

The etching gas supply system 150 includes a chamber 151 that is used to perform etching. A supply source 152 of the etching gas is connected to an etching shower 154 that is disposed in the chamber 151 through a gas supply valve 153 and a relative pressure control system 140. The etching shower 154 is disposed above one wafer 157 placed in the chamber 151, and an edge shower 156 is provided around a center shower 155.

The relative pressure control system 140 is configured such that a first air operated valve 102A (corresponding to "variable orifice means") and a second air operated valve 102B (corresponding to "variable orifice means") are provided in parallel for a controlled-fluid supply pipeline 109 connected to the gas supply valve 153 that supplies controlled fluids, such as $O_2$, Ar, $C_4F_8$, and CO. The relative pressure control system 140 thus configured outputs the controlled fluid from the first and second air operated valves 102A and 102B. A normally open air operated valve is used as the first, second air operated valve 102A, 102B. The air operated valves are thus used because they each have a large flowpath sectional area and produce a less flow loss.

Figure 13:
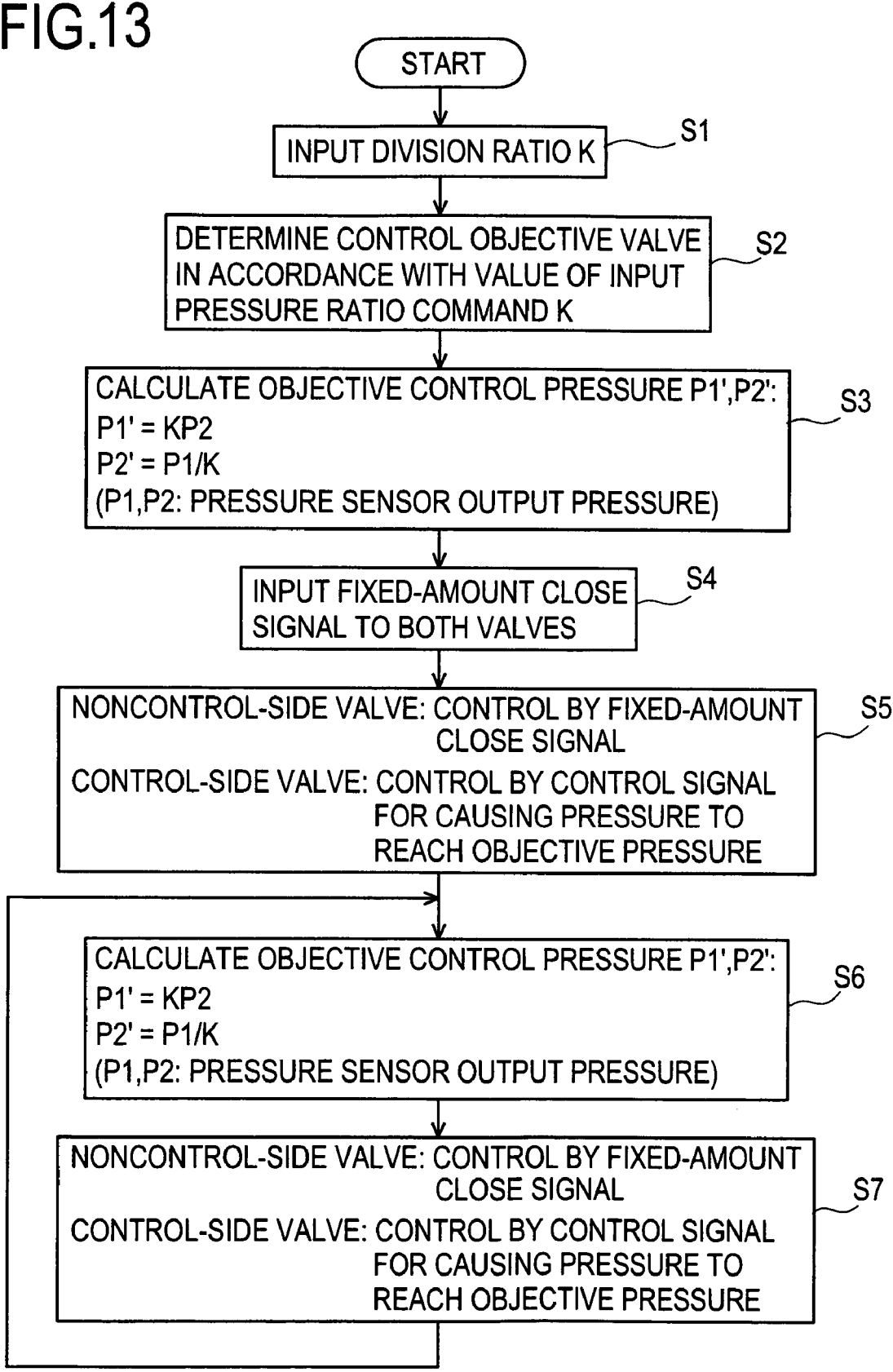
FIG. 13 is a flowchart of operation according to the fourth embodiment.

A control program stored in a controller 106 will now be described. FIG. 13 shows a relevant flowchart. A division ratio is input from a central controller 158 (at S1 (S: step)). Then, a control objective valve is determined in accordance with the value of an input pressure ratio command K (at S2). Subsequently, respective objective control pressure P1', P2' is calculated using expressions (P1'=KP2), (P2'=P1/K) (at S3). P1 and P2 are each a pressure-sensor output pressure.

Subsequently, a fixed-amount closing signal is input to two valves (at S4). In the present embodiment, the valve is closed 25% of the fully opened state thereof.

Figure 14:
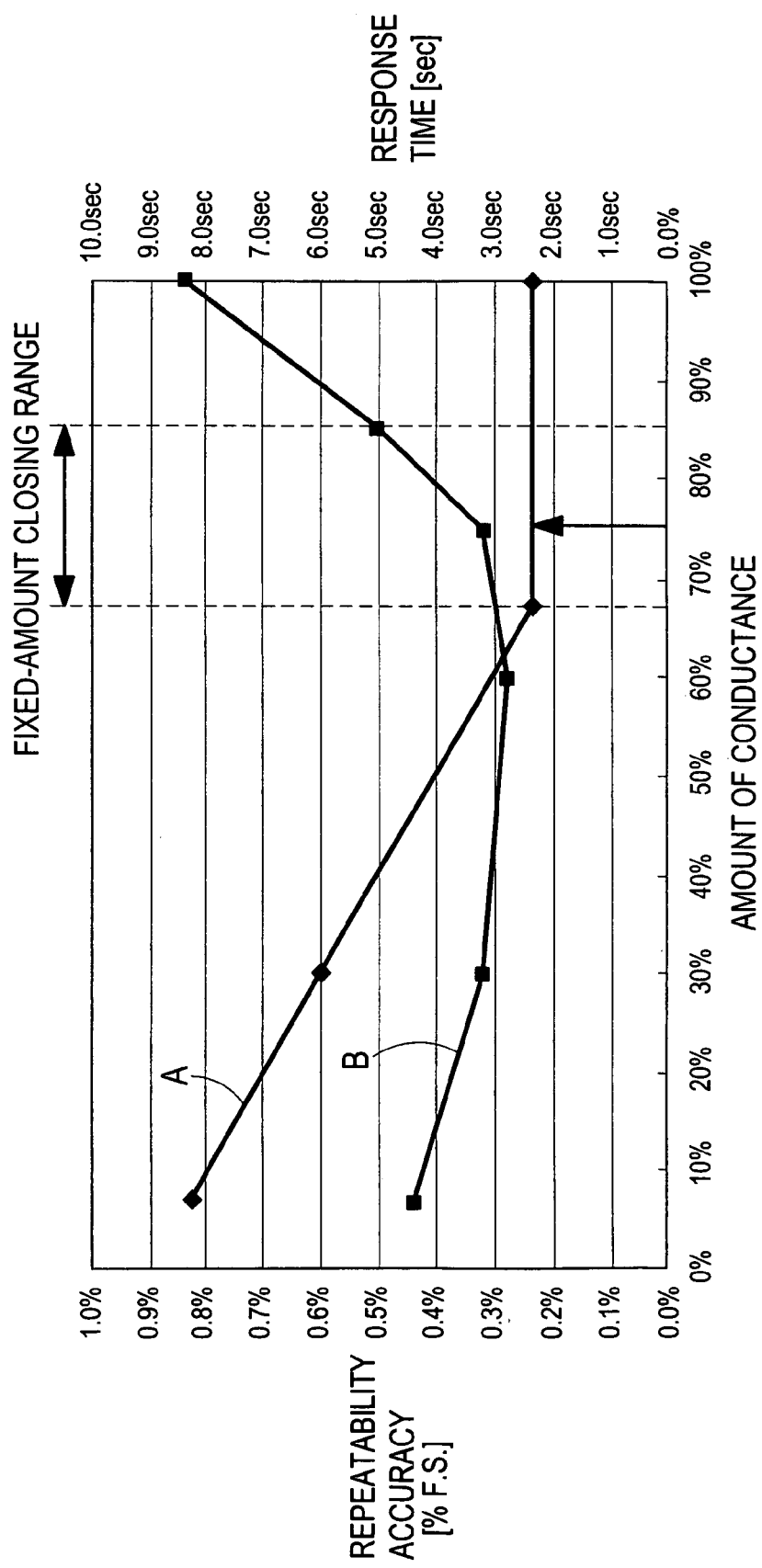
FIG. 14 is a data diagram descriptive of a fixed amount according to the fourth embodiment.

FIG. 14 shows the results of experimentation (testing) performed by the inventors. The horizontal axis represents an amount of conductance, or more specifically, the opening ratio to the full open which ratio takes a reciprocal numeric value with respect to a closing amount. The left vertical axis represents a repeatability accuracy of a valve stroke, and the right vertical axis represents the response time. Responsiveness data is shown by B, and repeatability accuracy data is shown by A.

According to the experimentation data, a preferable fixed closing amount is in the range of 5% or more to 35% or less. More preferably, the fixed closing amount is in the range of 15% or more to 30% or less. If lower than 5%, the objective effects and advantages of the present invention cannot by obtained. If higher than 35%, the responsiveness is low as a problem. As such, if in the range of 15% or more to 30% or less, the effects and advantages of the present invention can be exhibited, and concurrently, necessary responsiveness can be obtained.

Subsequently, the noncontrol-side valve is controlled in accordance with the fixed-amount closing signal, and the control-side valve is controlled in accordance with a control signal causing the pressure to reach a desired pressure (at S5). Then, the respective objective control pressure P1', P2' is calculated using expressions (P1'=KP2), (P2'=P1/K) (at S6). P1 and P2 are each a pressure-sensor output pressure. Then, the noncontrol-side valve is controlled in accordance with the fixed-amount closing signal, and the control-side valve is controlled in accordance with a control signal causing the pressure to reach a desired pressure (at S7). Subsequently, the operation returns to S6.

A case where the flow rate is varied will be described herebelow.

Figure 15:
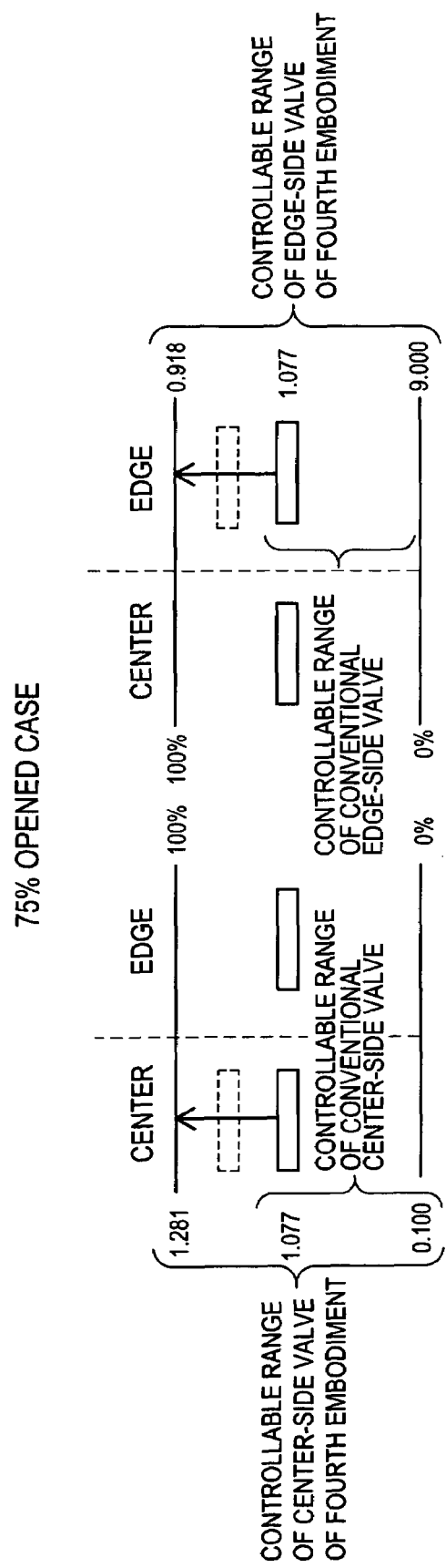
FIG. 15 is a diagram descriptive of effects according to the fourth embodiment.
Figure 16:
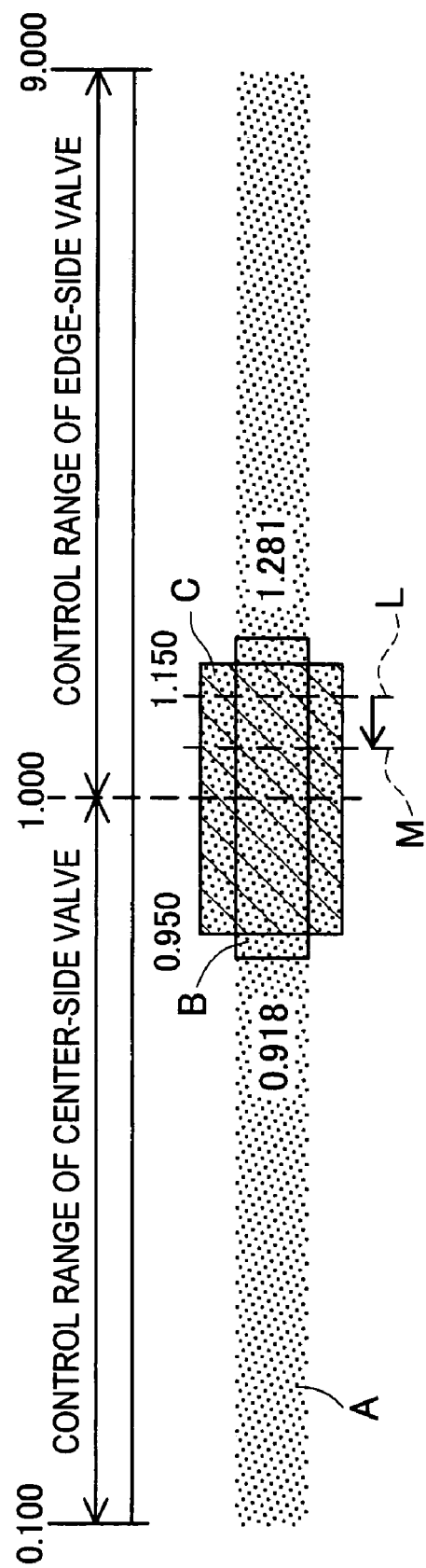
FIG. 16 is a diagram descriptive of the effects according to the fourth embodiment.

FIG. 15 shows a range controllable by the relative pressure control system of the fourth embodiment, and a range controllable by the conventional system. FIG. 16 shows a range controllable by the relative pressure control system of the fourth embodiment. In FIG. 16, A represents a zone of the pressure ratio control being performed with the one-side valve being fixed and the one-side valve being operated. B represents a zone controllable by pressure ratio control with either with the center-side valve or the edge-side valve. C represents a zone of pressure ratio variations occurring with the relative pressure control system and devices.

As an example, a practical pressure ratio is assumed to be 1.077 (L in FIG. 16). The pressure ratio is 1.281 in the event that the edge-side valve is closed by a fixed amount (25%) and the center-side valve is fully opened. The pressure ratio is 0.918 in the event that the center-side valve is closed by a constant amount (25%) and the edge-side valve is fully opened. In this case, the pressure ratio is defined as: Pressure ratio=Center-side pressure/Edge-side pressure.

Even if the control valve is determined based on 1.000 as a threshold value, the range of 0.918 to 1.281 can be controlled for the pressure ratio by either of the valves, as shown in FIGS. 15 and 16.

More specifically, a case will be discussed where the practical pressure ratio is 1.077 and the objective control pressure ratio is 1.050 (M in FIG. 16). In this case, according to the conventional system, since the ratio is higher than 1.000, control of the edge-side valve is started. However, since the pressure ratio is already 1.077 in the fully opened state, the pressure ratio cannot be regulated to the objective pressure ratio of 1.050 by controlling the edge-side valve, thereby resulting in control error. However, according to the system of the fourth embodiment, even when control of the edge-side valve has been started, the edge-side valve proceeds from the position, at which the valve is closed by the fixed amount (25%), along the direction of full open. Thereby, the pressure ratio can be controlled to 1.050. (Since the pressure ratio can controlled to the range to 0.918 by using the edge-side valve, 1.050 is controllable.)

A case where the flow rate is varied will now be described.

Figure 17:
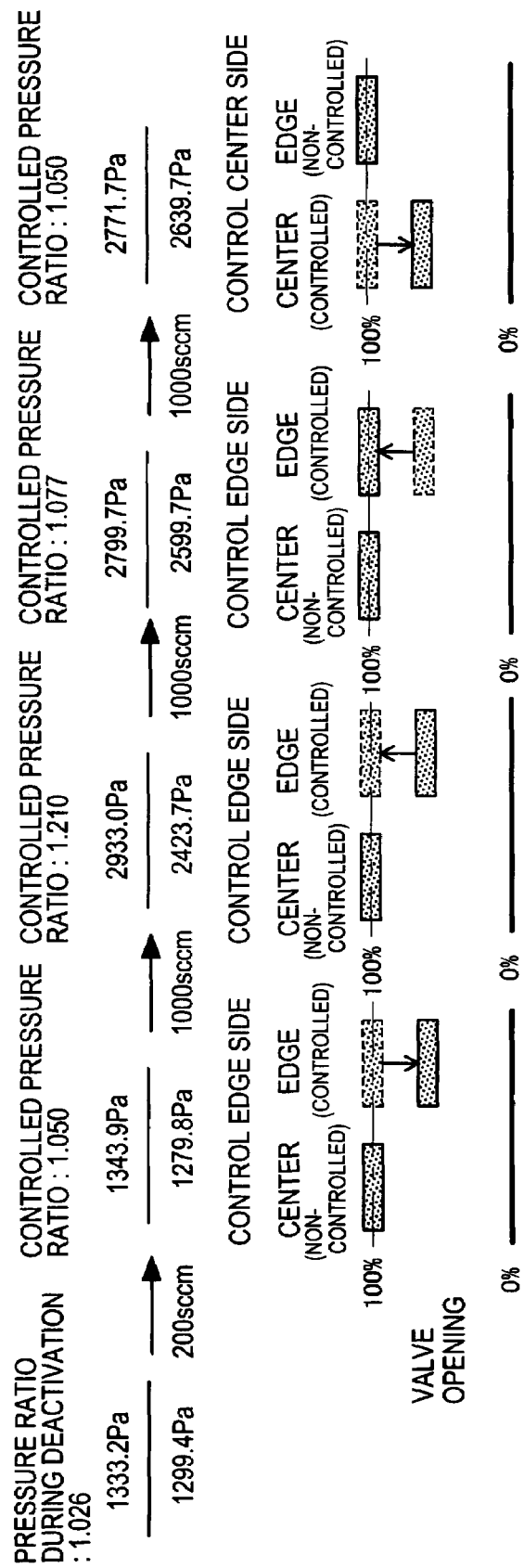
FIG. 17 is a first descriptive diagram descriptive of other effects according to the fourth embodiment.
Figure 18:
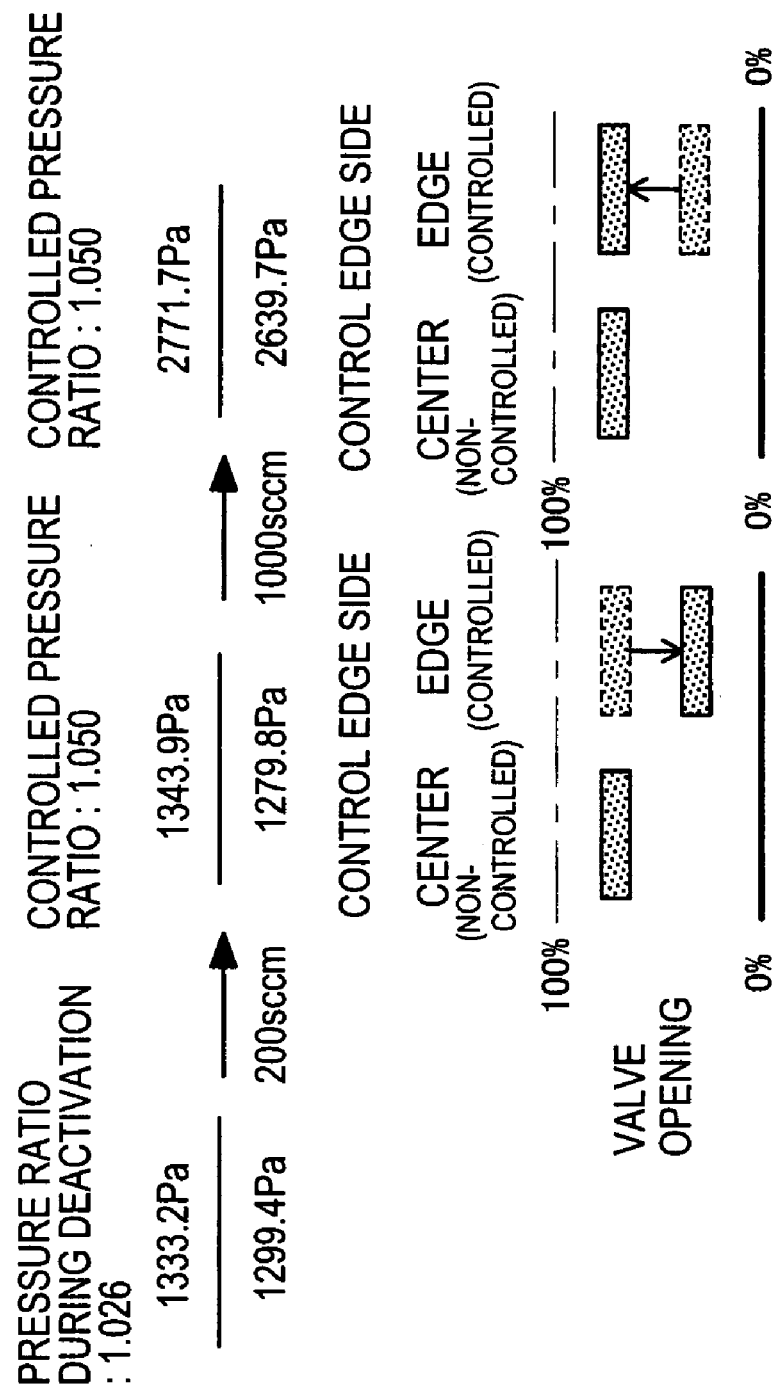
FIG. 18 is a second descriptive diagram descriptive of other effects according to the fourth embodiment.
Figure 19:
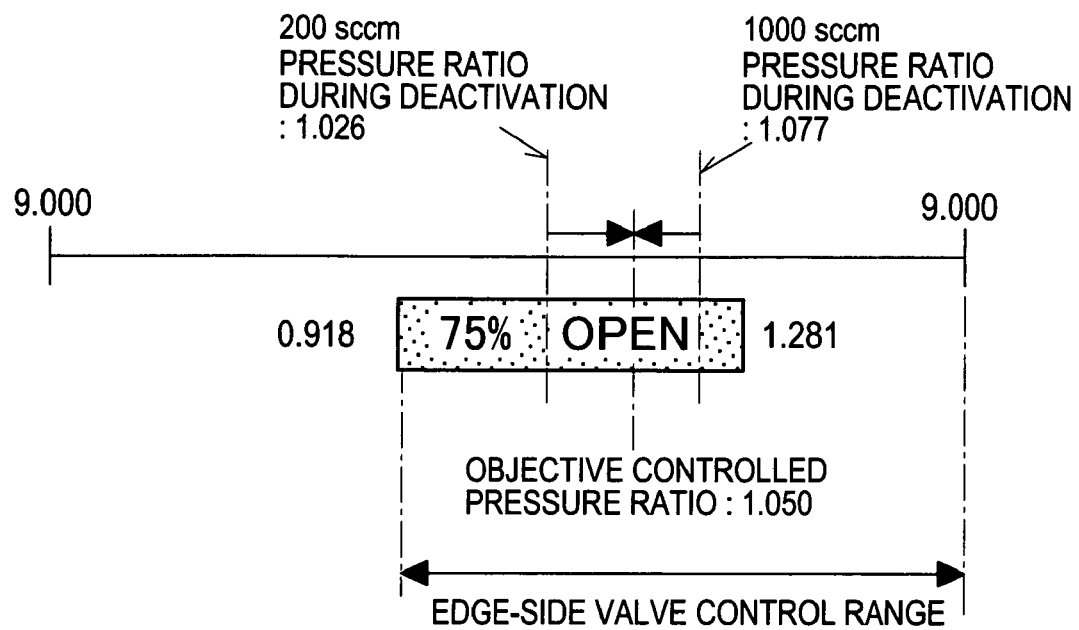
FIG. 19 is a third descriptive diagram descriptive of other effects according to the fourth embodiment.

For example, a case will be discussed where the flow rate is desired to be varied from 200 sccm to 1000 sccm. FIG. 17 shows a time-series flow of control by the conventional system. FIG. 18 shows a time-series flow of control by the system of the fourth embodiment. FIG. 19 shows variations in a deactivation-time pressure ratio when the flow rate has varied from the 200 sccm to 1000 sccm. While the deactivation-time pressure ratio is 1.026 in the event of 200 sccm, the deactivation-time pressure ratio varies to 1.077 in the event of 1000 sccm. Such variations are considered to occur because of influence of the conductance of pipelines and the like.

As shown in FIG. 17, according to the conventional system, the noncontrol-side valve is kept open, and the control is carried out only with the noncontrol-side valve, so that the pressure ratio cannot be converged into the objective value in that state. For this reason, the system once determines the instance to be abnormal, and has to perform valve shifting from the edge-side valve to the center-side valve, thereby causing a time loss.

However, as shown in FIG. 18, according to the system of the fourth embodiment, the both valves are once closed by 25%. Accordingly, in the event of 200 sccm, the edge-side valve is controlled to be able to regulate the pressure ratio to 1.050; and in addition, in the event of 1000 sccm, the edge-side valve is controlled to thereby be able to regulate the pressure ratio to 1.050. Thus, since the pressure ratio can be controlled to the range to 0.918, the operation is not influenced by variations in the deactivation-time pressure ratio due to flow rate variations. In this case, different from the conventional system, there occur abnormality determination and valve shift, the responsiveness can be improved. In addition, even in the event of a low flow rate, since the both-side valves are synchronously closed at the start of the control, slowness in the operation of the valve at the start of the control can be precluded, and hence the responsiveness can be improved.

Figure 20:
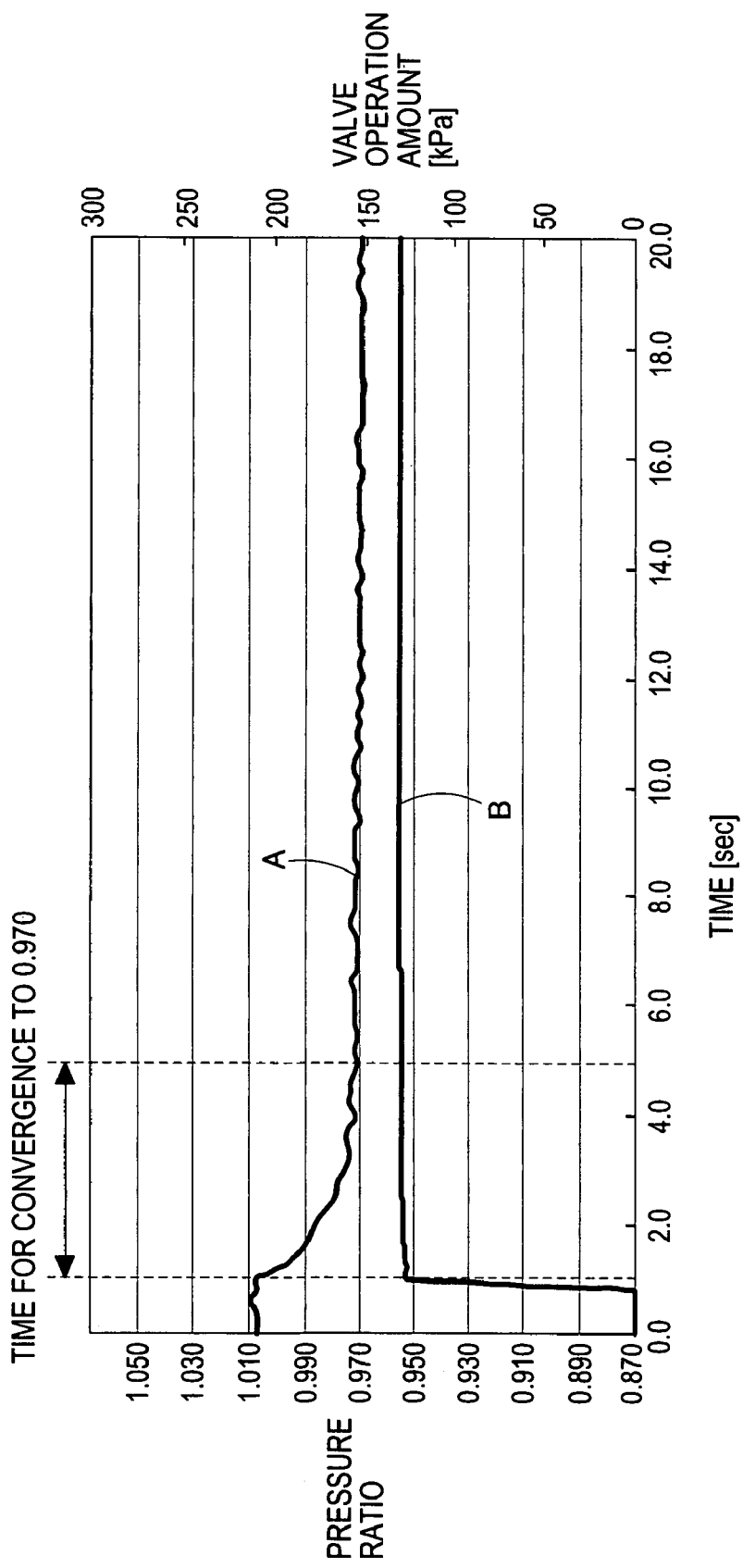
FIG. 20 is a diagram showing experimentation data in the fourth embodiment.
Figure 21:
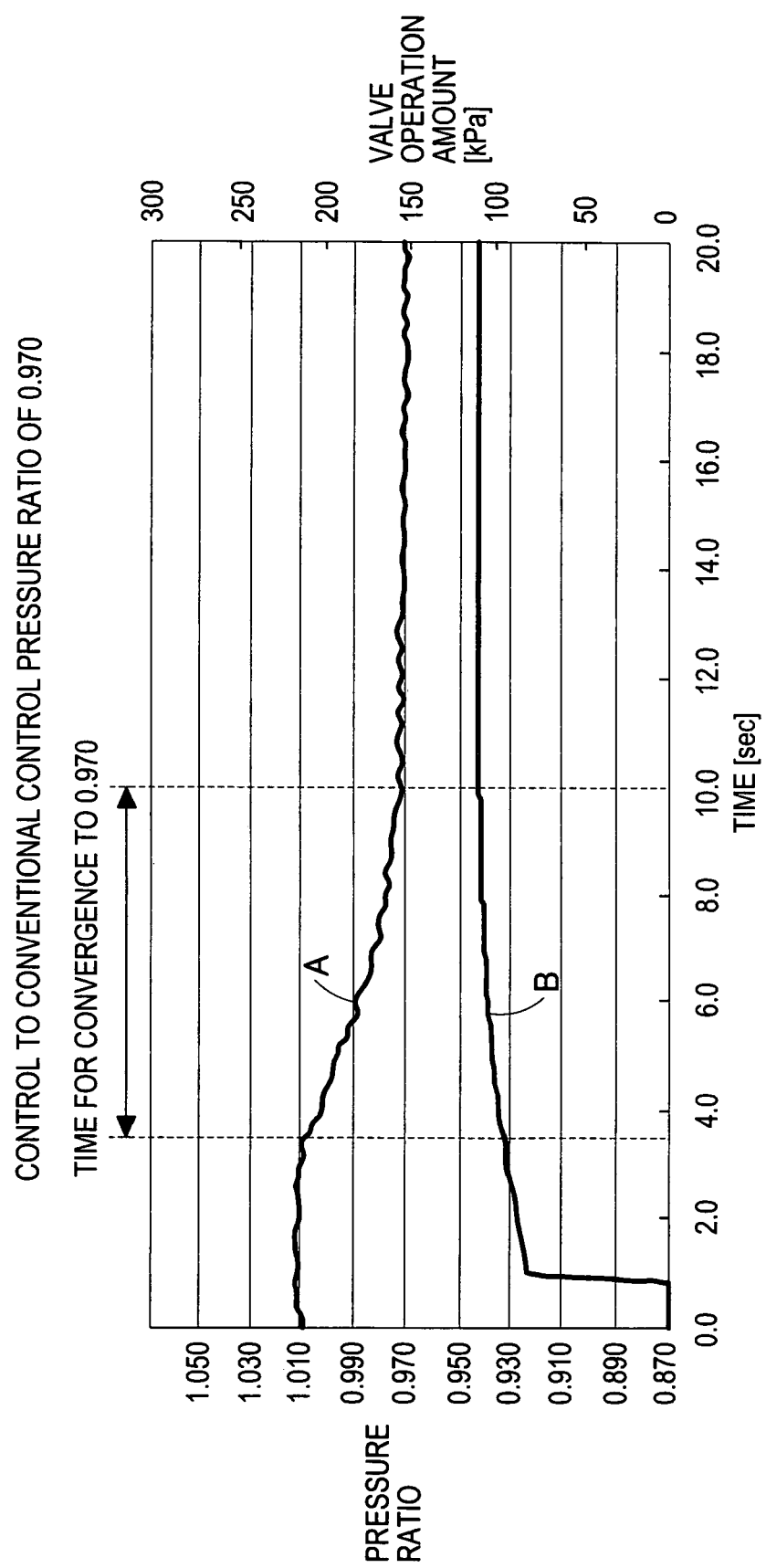
FIG. 21 is a diagram showing data in a conventional system.

FIG. 20 shows experimentation results of the relative pressure control system according to the fourth embodiment. FIG. 21 is a diagram showing data in a conventional system as a comparative example. In either of the diagrams, the horizontal axis represents the time, the left vertical axis represents the pressure ratio, and the right vertical axis represents the amount of valve operation. In addition, B shows a waveform of the amount of the valve operation, and A shows a pressure ratio waveform in the course until the pressure ratio converges into 0.970.

As shown in FIG. 21, in the conventional system, the valve is converged into an objective value of the valve pressure ratio of 0.970. However, as shown in FIG. 20, in the relative pressure control system of the fourth embodiment, the valve pressure ratio is converged into the objective value in 3.8 sec, which shows high responsiveness of the present invention.

Figure 22:
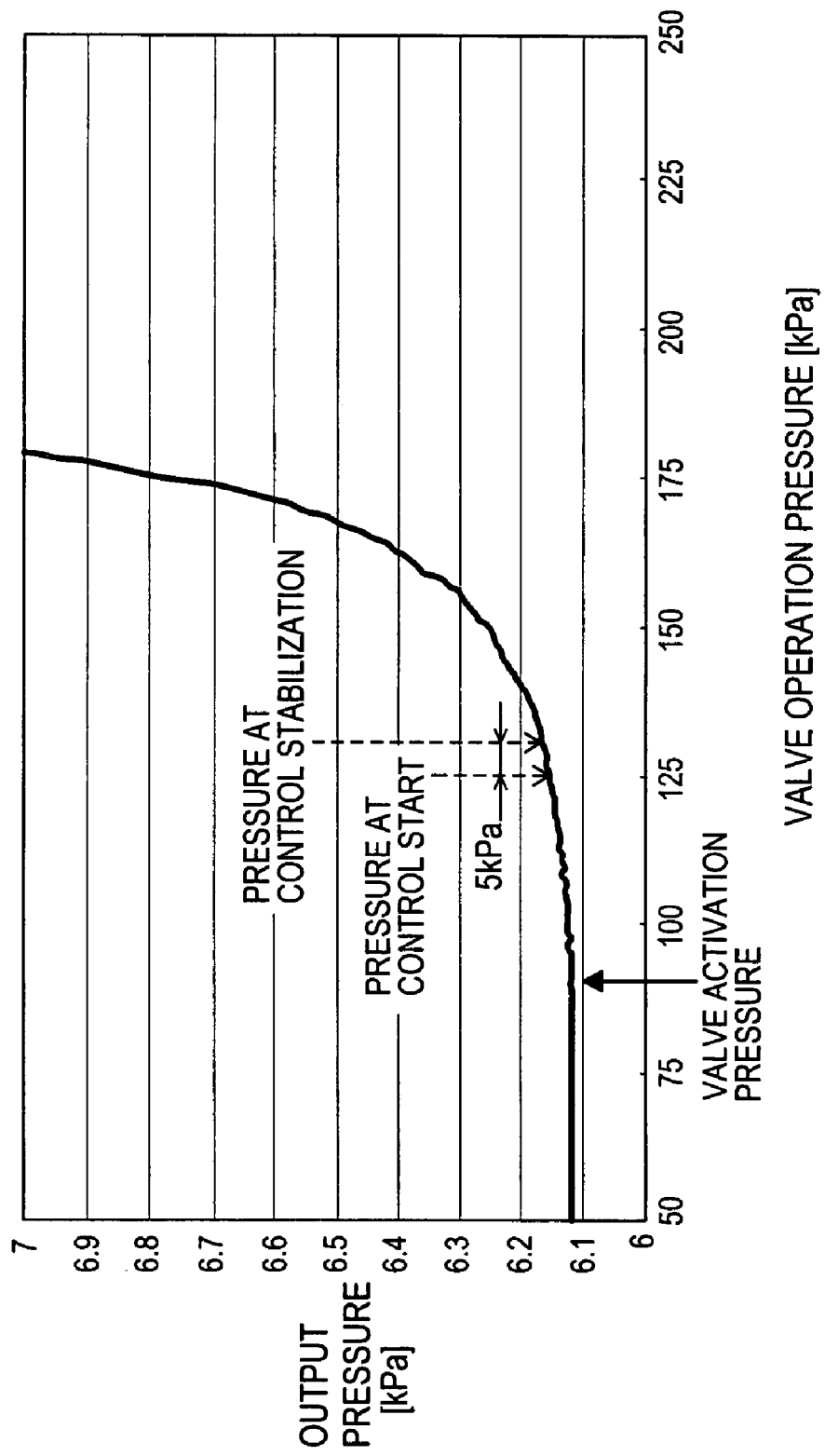
FIG. 22 is a diagram showing experimentation data in the fourth embodiment.
Figure 23:
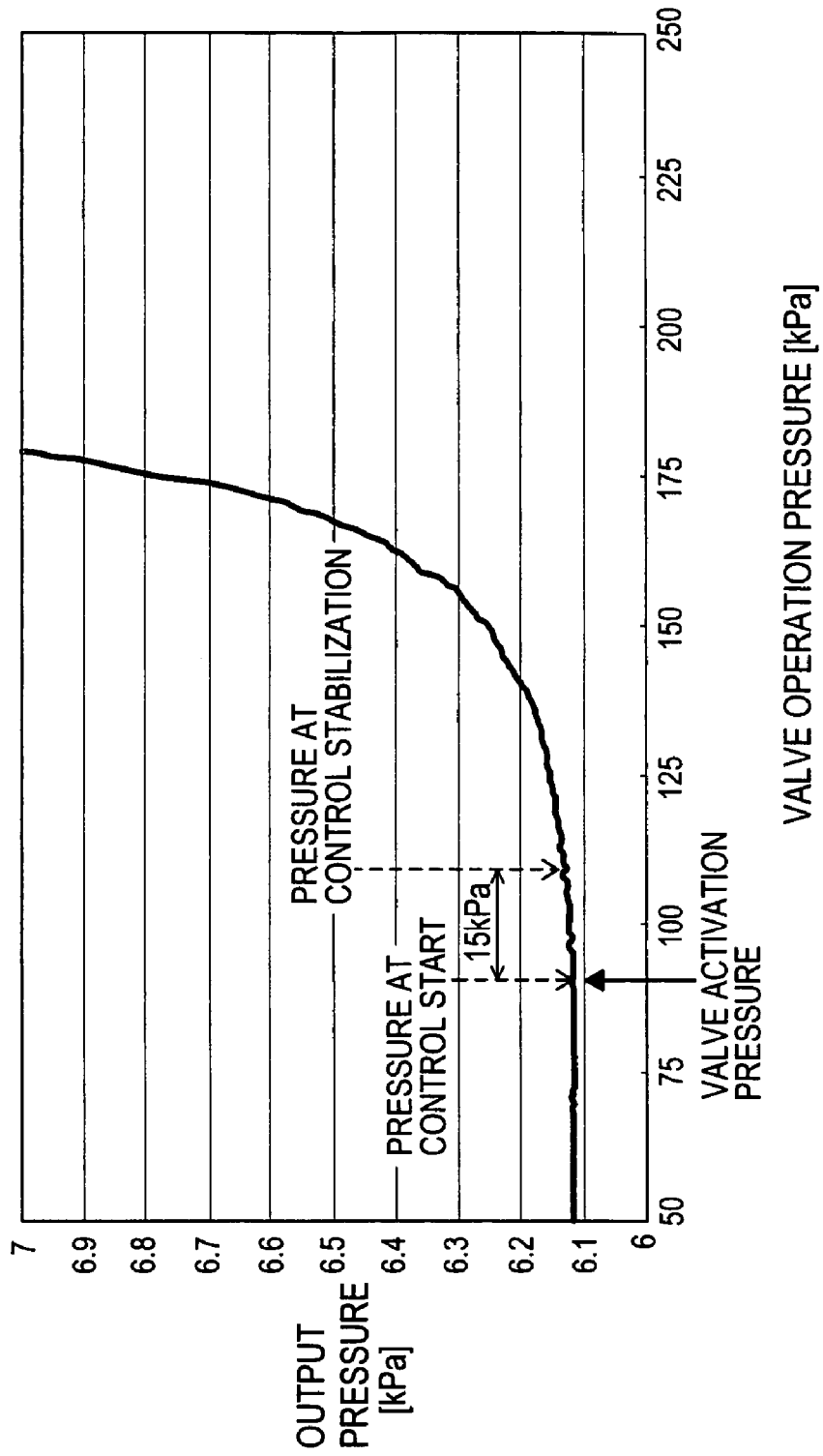
FIG. 23 is a diagram showing data in the conventional system.

The following will describe reasons for the high responsiveness in the fourth embodiment. FIG. 22 shows experimentation results in the relative pressure control system of the fourth embodiment. FIG. 23 shows data in the conventional system as a comparative example. In either of the diagrams, the horizontal axis represents the valve operation pressure, and the vertical axis represents the pressure being output. In the conventional system, 15 kPa is necessary to obtain a predetermined output pressure; however, in the system of the fourth embodiment, just 5 kPa is necessary to obtain the same predetermined output pressure. Thus, the responsiveness is improved in the system of the fourth embodiment.

As described in detail above, the relative pressure control system includes air operated valves 8A (102A) and 8B (102B) capable of performing variably control of a plurality of flow path areas provided in parallel to the single controlled-fluid supply pipeline; pressure sensors 3A (103A) and 3B (103B) series connected to the air operated valves 8A and 8B, respectively; and the controller 25 (106) for controlling the open and close operations of the air operated valves 8A and 8B. The controlled fluid is output at a predetermined division ratio from the air operated valves 8A and 8B in accordance with the results of detection performed by the pressure sensors 3A and 3B. The controller 25 includes arithmetic sections that calculate objective pressure ratios of the respective air operated valves 8A and 8B in accordance with the predetermined division ratio and the results of detection performed by the pressure sensors 3A and 3B; and a signal processor section that creates control signals for being supplied to the air operated valves 8A and 8B and that outputs the control signals to the air operated valves 8A and 8B. Before outputting the signals, the controller 25 outputs fixed-amount closing signals for reducing fixed amounts of the conductance of the air operated valves 8A and 8B. As such, by synchronously closing the two valves by the fixed amounts at the start of the control, the zone controllable for the pressure ratio can be increased and the noncontrollable zone can be precluded.

Further, in the relative pressure control system, the fixed closing amount is in the range of 5% or more to 35% or less of the conductance in the fully opened state, so that the effects and advantages of the present invention can be obtained.

Fifth Embodiment

A fifth embodiment of the present invention will be described herebelow. Because the basic configuration shown in FIG. 12 is substantially identical to the configuration of the fourth embodiment, descriptions of the same portions will be omitted herefrom.

Figure 11:
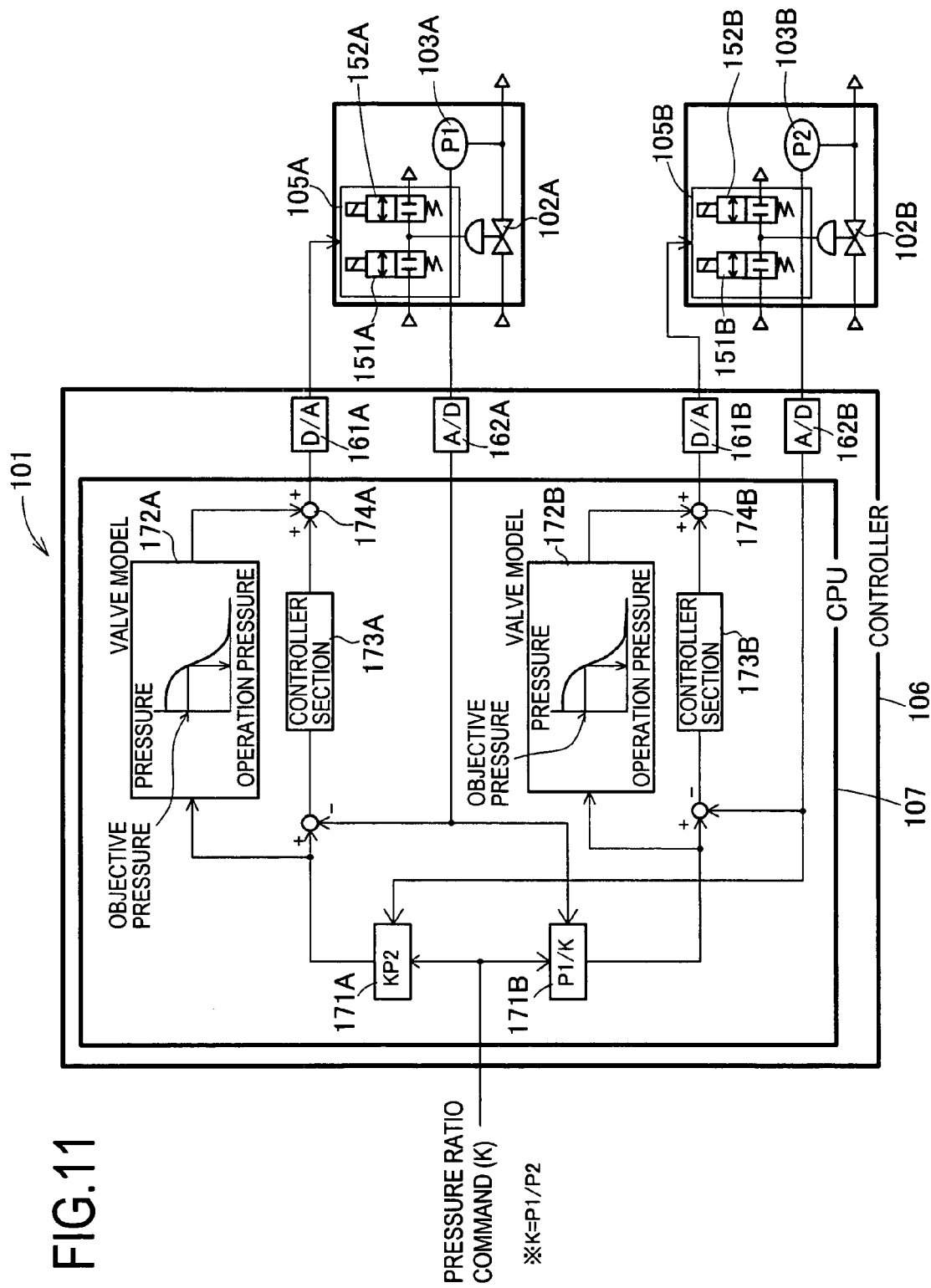
FIG. 11 is a block diagram of a relative pressure control system according to a fourth embodiment of the present invention.

FIG. 11 is a block diagram of a relative pressure control system 140 of the fifth embodiment.

The first and second air operated valves 102A and 102B, respectively, are supplied with the compressed air from a first electropneumatic regulator 105A and a second electropneumatic regulator 105B, and are thereby regulated for their valve openings. In the first and second air operated valves 102A and 102B, respectively, first and second pressure sensors 103A and 103B are series connected thereto, and output pressures P1 and P2 of the first and second air operated valves 102A and 102B are detected at a fixed cycle.

The controller 106 determines an operation pressure (corresponding to a "control signal") of the compressed air, which is to be supplied to the first, second air operated valve 102A, 102B, and supplies an electric signal, which functions to output the operation pressure, to a supply valve 151A, 151B and exhaust valve 152A, 152B of the first, second electropneumatic regulator 105A, 105B. For this reason, the controller 106 includes a central processing unit 107 ("CPU," hereafter). This CPU 107 is a standard CPU, not a dual core CPU. The CPU 107 includes arithmetic sections 171A and 171B provided in parallel connection. The arithmetic sections 171A calculates an objective pressure P1' (=KP2) of the first air operated valve 102A in accordance with the pressure ratio command K. The arithmetic section 171B calculates an objective pressure P2' (=P1/K) of the second air operated valve 102B.

A valve model section 172A and a controller section 173A are parallel connected to the arithmetic section 171A. The valve model section 172A stores a valve model having a predetermined operation pressure for controlling an output pressure P1 of the first air operated valve 102A to the objective value P1'. The controller section 173A determines an operation pressure in accordance with the difference between the output pressure P1 fed back from the first pressure sensor 103A and the objective pressure P1' of the first air operated valve 102A which has been input from the arithmetic section 171A. The valve model section 172A and the controller section 173A are connected together at a summing point 174A, and are connected to the first electropneumatic regulator 105A through a D/A converter 161A. The first pressure sensor 103A is connected to the arithmetic section 171B through an A/D converter 162A, and is feedback connected to the upstream side of the controller section 173A. Components, such as the valve model section 172A, the controller section 173A, and the summing point 174A, together configure a "signal processor section" as stated in the appended claims.

A valve model section 172B and a controller section 173B are parallel connected to the arithmetic section 171B. The valve model section 172B stores a valve model having a predetermined operation pressure for controlling an objective pressure P2 of the second air operated valve 102B to the objective value P2'. The controller section 173B determines an operation pressure in accordance with the difference between the output pressure P2 fed back from the second pressure sensor 103B and the objective pressure P2' of the second air operated valve 102B which has been input from the arithmetic section 171B. The valve model section 172B and the controller section 173B are connected together at a summing point 174B, and are connected to the second electropneumatic regulator 105B through a D/A converter 161B. The second pressure sensor 103B is connected to the arithmetic section 171A through an A/D converter 162B, and is feedback connected to the upstream side of the controller section 173B. Components, such as the valve model section 172B, the controller section 173B, and the summing point 174B, configure a "signal processor section" as stated in the appended claims.

The relative pressure control system 140 (101) thus configured performs operation as described herebelow.

In the case that the controlled fluid is not at all supplied from a fluid control valve 153 to the controlled-fluid supply pipeline 109, a stop signal is supplied to the supply valve 151A, 151B and exhaust valve 152A, 152B of the first, second electropneumatic regulator 105A, 105B to close the valves. Accordingly, the first, second air operated valve 102A, 102B is not at all supplied with the operation pressure, and hence is fully opened.

Thereafter, when the controlled fluid is supplied to the controlled-fluid supply pipeline 109 from the fluid control valve 153, the controlled fluid is divided and supplied to the first and second air operated valves 102A and 102B and is output from the first and second air operated valves 102A and 102B. With the first pressure sensor 103A, the output pressure P1 of the first air operated valve 102A is detected, is input to the arithmetic section 171B of the CPU 107 through the A/D converter 162A, and is then fed back to the controller section 173A. Similarly, with the second pressure sensor 103B, the output pressure P2 of the second air operated valve 102B is detected, is input to the arithmetic section 171A of the CPU 107 through the A/D converter 162B, and is then fed back to the controller section 173B.

In the CPU 107, an arbitrary pressure ratio command K (K=P1/P2) is input, and the operation pressure to be supplied to the first, second air operated valve 102A, 102B in accordance with the pressure ratio command K and the output pressure of the first, second air operated valve 102A, 102B.

In more specific, the arithmetic sections 171A multiplies the value of the pressure ratio command K with the output pressure P2 of the second air operated valve 102B which has been input from the second pressure sensor 103B, thereby normally performing the objective pressure P1' (=KP2) of the first air operated valve 102A. The controller section 173A determines the operation pressure that is supplied to the first air operated valve 102A in accordance with the difference between the objective pressure P1', which has been calculated by the arithmetic sections 171A, and the output pressure P1 fed back from the first pressure sensor 103A.

However, since the first air operated valve 102A has low responsiveness, the control merely performed by the controller section 173A causes an operational retardation. To prevent the problem, the objective pressure P1', which has been calculated by the arithmetic sections 171A, is input to the valve model section 172A to be applied to the data of the valve model. Thereby, a necessary operation pressure to regulate the output pressure P1 of the first air operated valve 102A to the objective pressure P1' is calculated. Consequently, the output pressure P1 of the first air operated valve 102A can be controlled to quickly reach the objective pressure P1'.

In this event, the operation pressure determined by the controller section 173A is added at the summing point 174A to the operation pressure determined by the valve model section 172A, thereby to supplement the operation pressure in the instance that cannot be satisfied only by the valve model section 172A. The operation pressure thus determined is converted in the D/A converter 161A to an analog signal, and the signal is normally supplied to the first electropneumatic regulator 105A, thereby to regulate the valve opening of the first air operated valve 102A.

On the other hand, the arithmetic sections 171B divides the output pressure P1 of the first air operated valve 102A, which has been input from the first pressure sensor 103A, by the value of the pressure ratio command K, thereby to normally calculate the objective pressure P2' (=P1/K) of the second air operated valve 102B. The controller section 173B determines the operation pressure that is supplied to the second air operated valve 102B in accordance with the difference between the objective pressure P2', which has been calculated by the arithmetic sections 171B, and the output pressure P2 fed back from the second pressure sensor 103B.

However, since the second air operated valve 102B has low responsiveness, the control merely performed by the controller section 173B causes an operational retardation. To prevent the problem, the objective pressure P2', which has been calculated by the arithmetic sections 171B, is input to the valve model section 172B to be applied to the data of the valve model. Thereby, a necessary operation pressure to regulate the output pressure P2 of the second air operated valve 102B to the objective pressure P2' is calculated. Consequently, the output pressure P2 of the second air operated valve 102B can be controlled to quickly reach the objective pressure P2'.

In this event, the operation pressure determined by the controller section 173B is added at the summing point 174B to the operation pressure determined by the valve model section 172B, thereby to supplement the operation pressure in the instance that cannot be satisfied only by the valve model section 172B. The operation pressure thus determined is converted in the D/A converter 161B to an analog signal, and the signal is normally supplied to the second electropneumatic regulator 105B, thereby to regulate the valve opening of the second air operated valve 102B.

Figure 24:
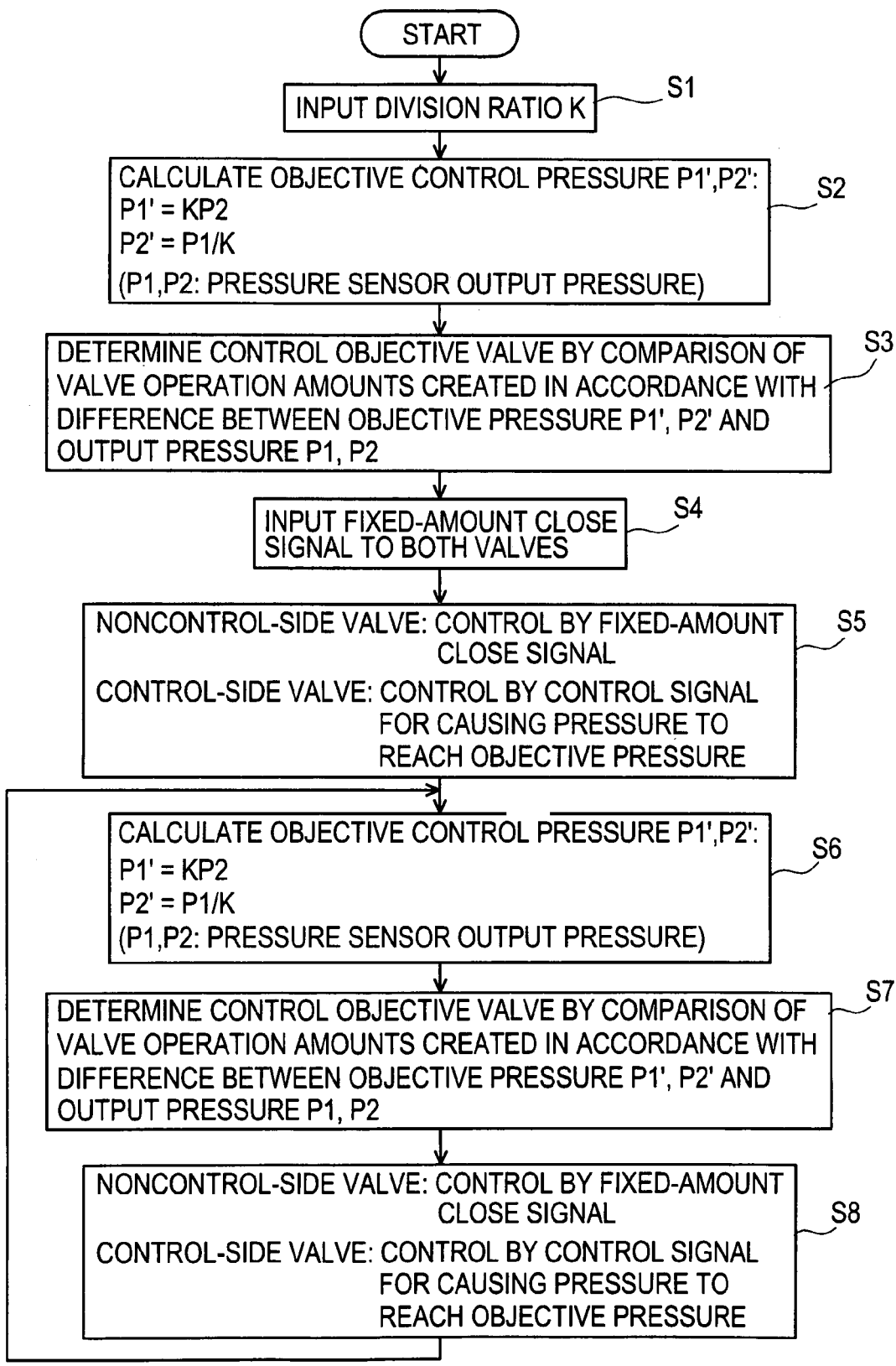
FIG. 24 is a flowchart of operation according to a fifth embodiment of the present invention.

A control program stored in a controller 106 will now be described. FIG. 24 shows a relevant flowchart. A division ratio is input from the central controller 158 (at S1). Then, respective objective control pressure P1', P2' is calculated using expressions (P1'=KP2), (P2'=P1/K) (at S2). P1 and P2 are each a pressure-sensor output pressure. Subsequently, a control target valve is determined by comparison between valve operation amounts created in accordance with the differences between the objective control pressure P1', P2' and the output pressure P1, P2 (at S3).

Subsequently, a fixed-amount close signal is input to two valves (at S4). In the present embodiment, the valve is closed 25% of the fully opened state thereof. Details are the same as those in the fourth embodiment, so that detailed descriptions will be omitted herefrom.

Subsequently, the noncontrol-side valve is controlled in accordance with a fixed-amount close signal, and the control-side valve is controlled in accordance with a control signal causing the pressure to reach a desired pressure (at S5). Then, the respective objective control pressure P1', P2' is calculated using expressions (P1'=KP2), (P2'=P1/K) (at S6). P1 and P2 are each a pressure-sensor output pressure.

Subsequently, a control target valve is determined by comparison between valve operation amounts created in accordance with the differences between the objective control pressure P1', P2' and the output pressure P1, P2 (at S7). Then, the noncontrol-side valve is controlled in accordance with the fixed-amount close signal, and the control-side valve is controlled in accordance with a control signal causing the pressure to reach a desired pressure (at S8). Subsequently, the operation returns to S6.

The following will discuss the control in the relative pressure control system 101.

The relative pressure control system 101 of the fifth embodiment operates as briefed hereinbelow. Output pressures P1 and P2 of the first and second air operated valves 102A and 102B, respectively, are input from the first and second pressure sensors 103A and 103B. In accordance with the pressure ratio command K and the output pressures P1 and P2 of the first and second pressure sensors 103A and 103B, objective control pressures P1' and P2' to be output by the first and second air operated valves 102A and 102B are normally calculated. Then, operation pressures necessary for the first and second air operated valves 102A and 102B to output the controlled fluid at the objective control pressures P1' and P2' are determined. The determined operation pressures are normally supplied to the first and second air operated valves 102A and 102B, thereby to control the first and second air operated valves 102A and 102B. Accordingly, according to the relative pressure control system 101 of the fifth embodiment, whatever may be the division ratio in the fully opened states of the first and second air operated valves 102A and 102B, all the range of the division ratio is controlled by normally supplying the operation pressures to the first and second air operated valves 102A and 102B without affecting the theoretical ratio of the shower plate. Consequently, the controlled fluid can be output at the predetermined division ratio from the first and second air operated valves 102A and 102B.

Thus, the noncontrollable zone is precluded by the normal supply of the operation pressures to the first and second air operated valves 102A and 102B, so that the differences in the conductance due to the pipeline and throttling need not be taken into account, and variations in sensor regulation and Cv value can be absorbed. Consequently, the yield can be up.

Further, the threshold value need not be set in units of the device (in units of the shower plate ratio), so that improved versatility can be exhibited.

Figure 25:
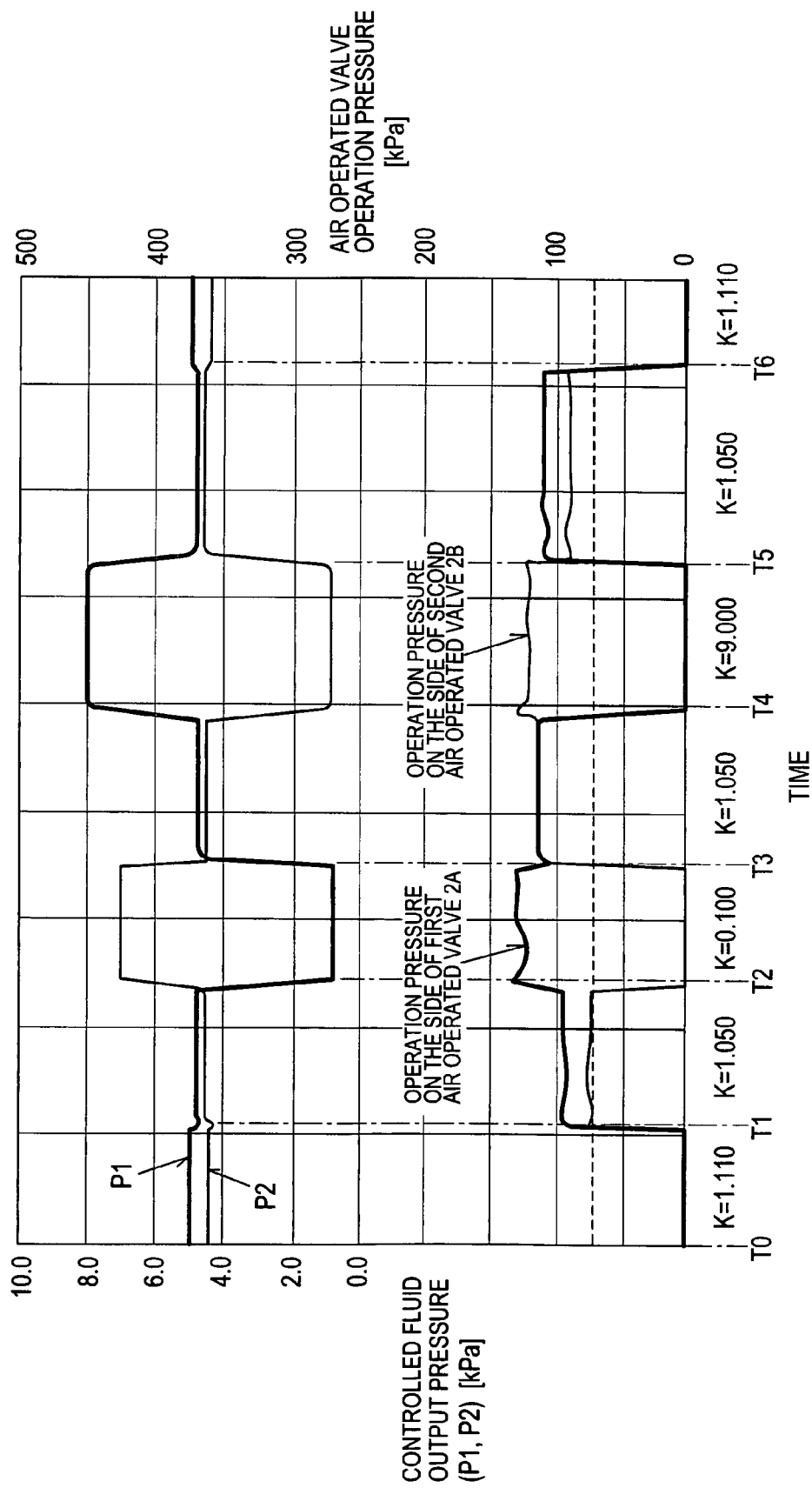
FIG. 25 is a diagram showing control waveforms in a relative pressure control system according to the fifth embodiment, wherein specifically shown is only in the case of an all-time ("normal," hereafter) output operation.
Figure 26:
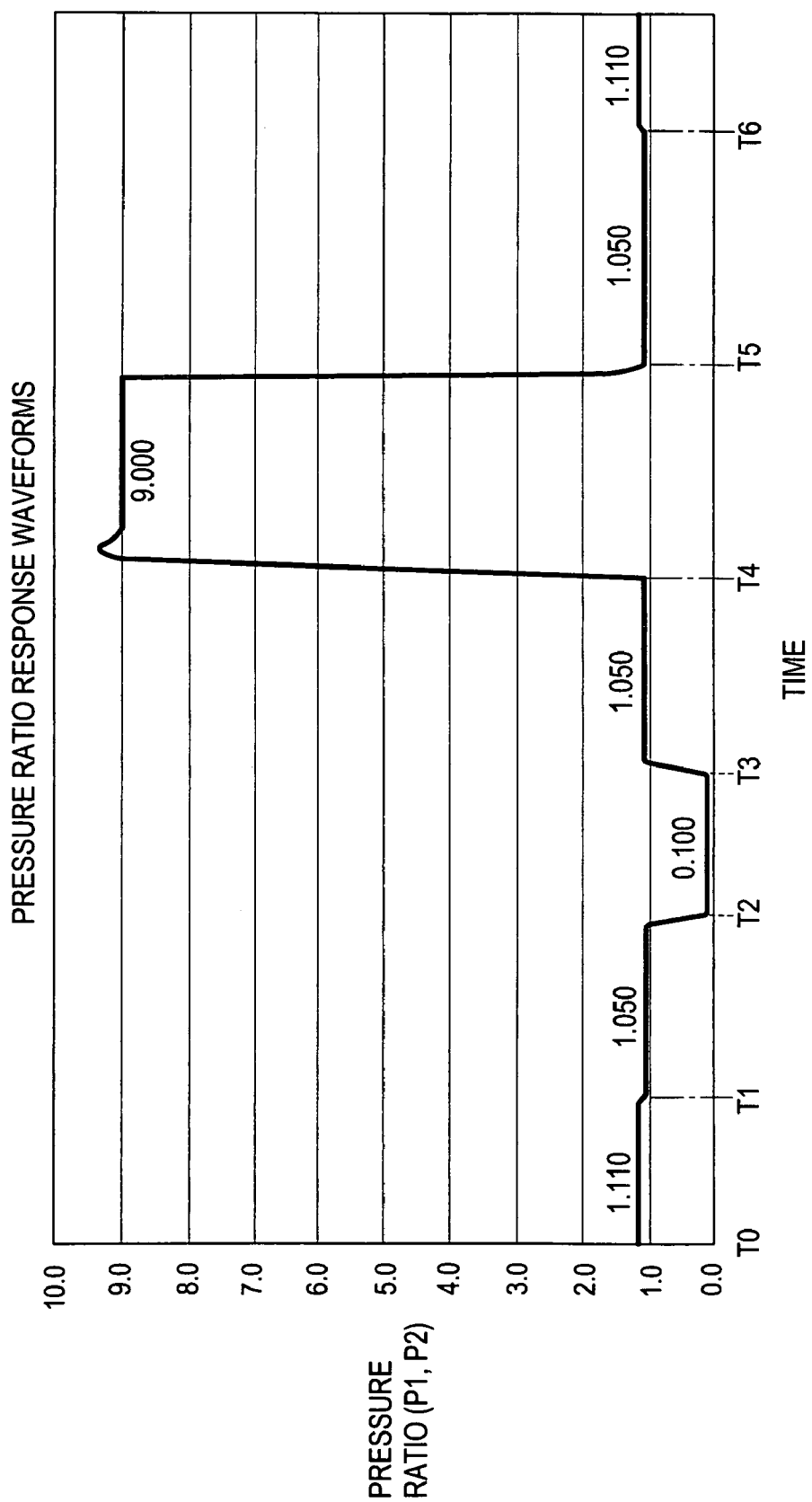
FIG. 26 is a diagram showing a control result of the relative pressure control system according to the fifth embodiment.
Figure 27:
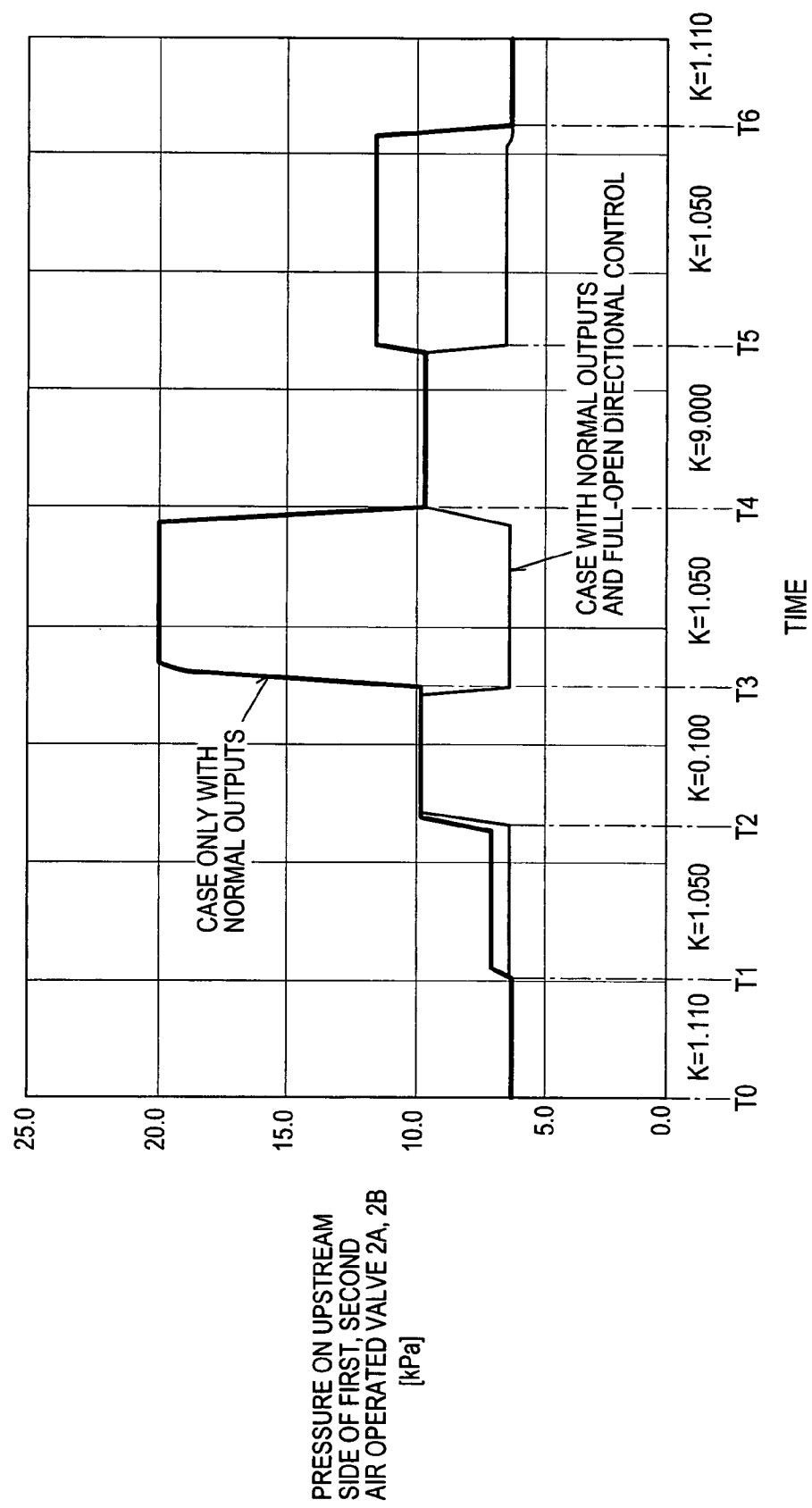
FIG. 27 is a diagram showing upstream-side pressures of first and second air operated valves according to the fifth embodiment.
Figure 28:
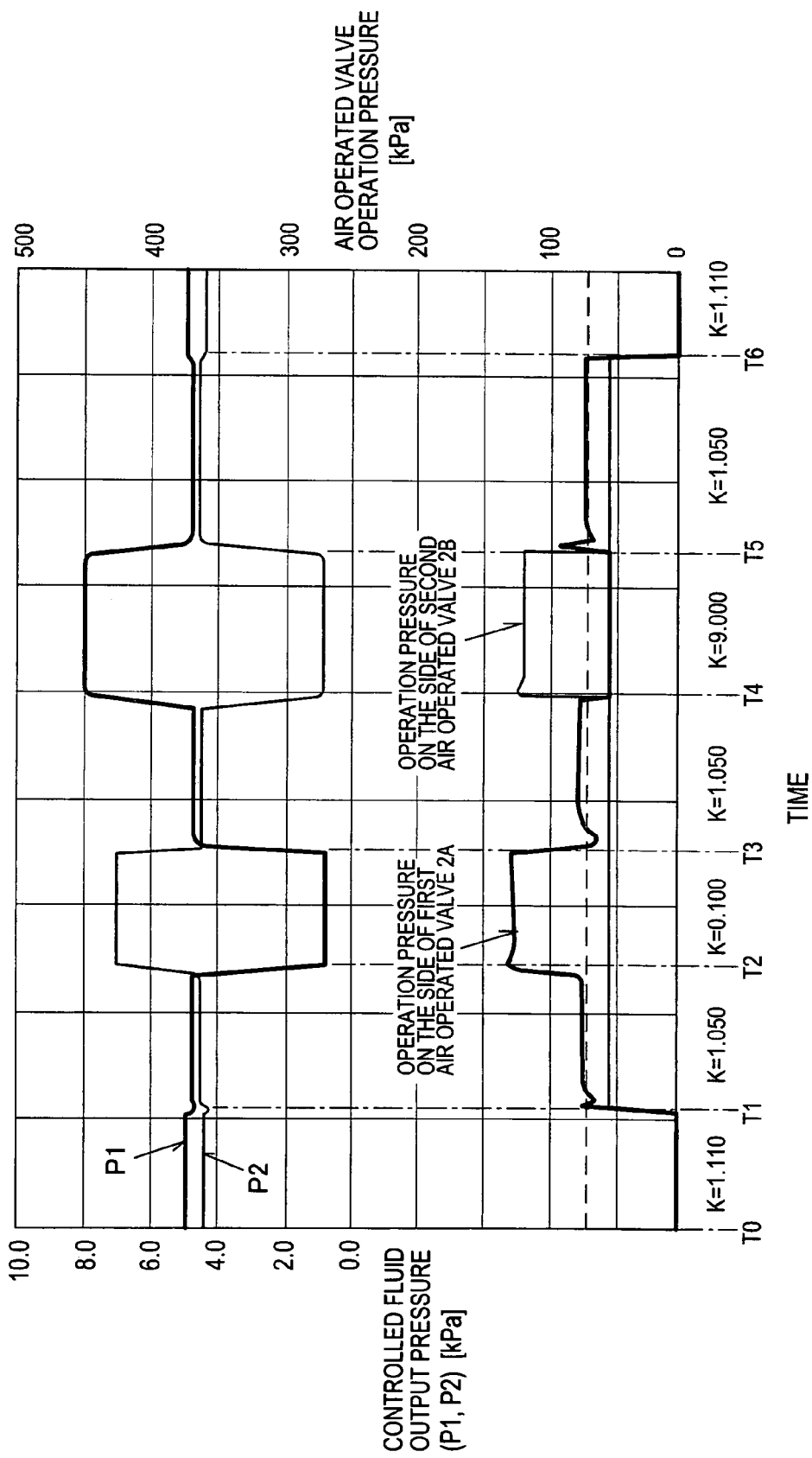
FIG. 28 is a diagram showing control waveforms in the relative pressure control system according to the fifth embodiment, wherein specifically shown is in the case of constant opening control in addition to the case of the normal output operation.
Figure 29:
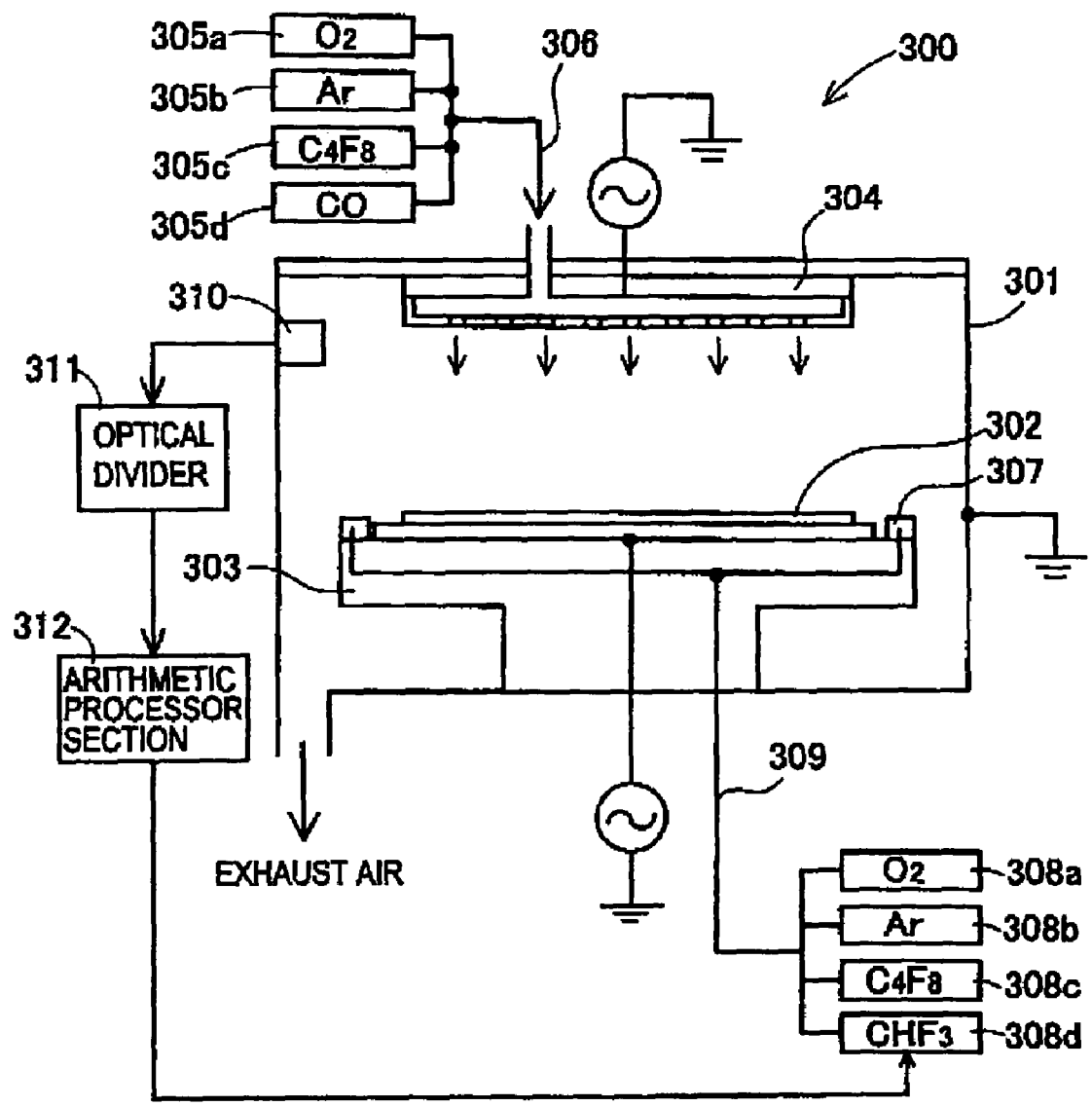
FIG. 29 is a schematic diagram of an overall configuration of a conventional etching gas supply system.
Figure 30:
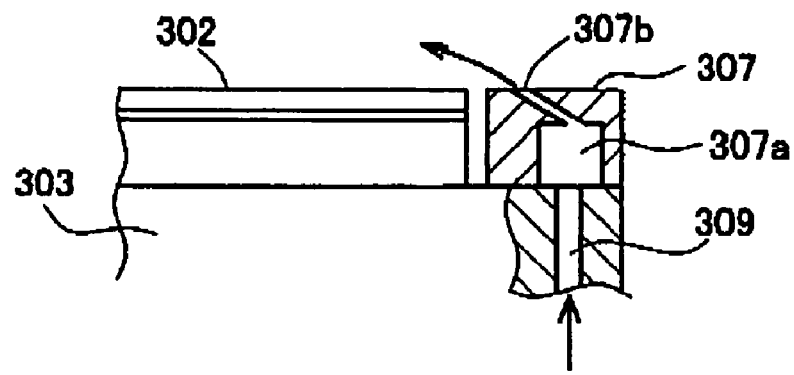
FIG. 30 is an enlarged cross sectional view of a focus ring portion in FIG. 29.
Figure 31:
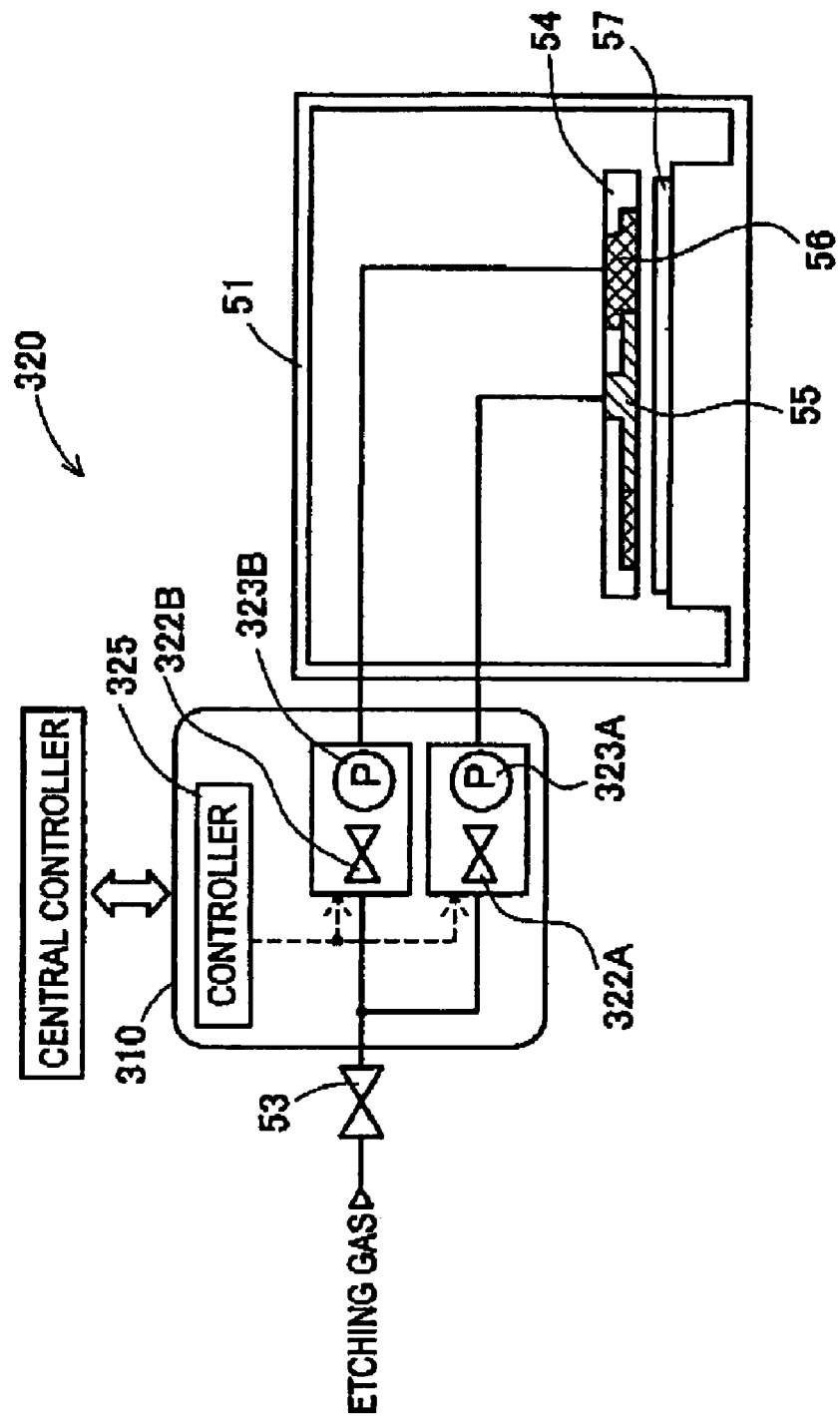
FIG. 31 is a view showing one example of a flowpath system of the conventional etching gas supply system.

In the above case, as shown in FIG. 25, for example, when the operation pressures are normally supplied to the first and second air operated valves 102A and 102B, the valve openings of the first and second air operated valves 102A and 102B are each regulated. As such, even when performing control to a same pressure ratio command "1.050", the amounts of operation of both of the first and second air operated valves 102A and 102B along the closing direction are different depending on respective time zones (see T1-T2, T3-T4, and T5-T6 of FIG. 25). Concurrently, as shown in FIG. 27, a phenomenon occurs wherein the pressure on the upstream side of the first, second air operated valve 102A, 102B increase to be diverse (see T1-T2, T3-T4, and T5-T6 shown by a bold line in FIG. 27). In such a case, as shown in FIG. 28, the operation pressures of the first and second air operated valves 102A and 102B are compared with one another. As a result, an operation pressure for performing fixed-amount valve closure is supplied to the air operated valve with a lower operation pressure to thereby control the opening thereof to the fixed opening. Concurrently, an operation pressure necessary for the output pressure to reach the objective pressure ratio is supplied to the other air operated valve to thereby regulate the valve opening thereof. According to the valve-opening control, the air operated valve not specified as a control objective can be controlled to a fixed opening, a normally optimal conductance can be maintained. Concurrently, increase in the pressure on the upstream side of the first, second air operated valve 102A, 102B can be restrained (see T1-T2, T3-T4, and T5-T6 shown by a thin line in FIG. 28).

Although the fifth embodiment has thus been described, the present invention is not limited to the fifth embodiment, but can be applied in various other ways as follows.

(1) For example, in the embodiment described above, the partial pressure control of the controlled fluid being output from the first, second air operated valve 102A, 102B has been described. However, even in the case of three or more air operated valves 102, flow-dividing control may be performed in a similar manner.

(2) For example, in the embodiment described above, the normally open air operated valves are used as the fluid control valves. However, normally open solenoid valves may be used as the fluid control valves, wherein the open and close operations thereof are started when a voltage exceeding a threshold value is applied.

(3) For example, in the embodiment described above, the normally open air operated valve 102A, 102B is used as the fluid control valve, and the controlled fluid is controlled to a predetermined division ratio. However, a normally closed fluid control valve (air operated valve, solenoid valve, or piezo-electric valve, for example) may be used to control the controlled fluid to the predetermined division ratio. In this case, the normally closed fluid control valve is controlled in accordance with the reverse concept of the case of control of the normally open fluid control valve. In practice, for example, a case is assumed where two normally closed air operated valves are parallel connected to the single controlled-fluid supply pipeline 109, wherein the operation pressure is normally supplied thereto to control the division ratio. Even in this case, similarly as in the above-described embodiment where the first, second normally open air operated valve 102A, 102B is used, the pressure on the upstream sides of the normally closed air operated valves is increased. In this case, the particular flow rate control of the fluid control valve 153 that regulates the flow rate and composition of the controlled fluid is probably influenced. As such, in a case where the increase in the pressure on the upstream sides of the normally closed air operated valves is undesired, the operation can be arranged as follows. The amounts of operation calculated by the arithmetic sections in units of the air operated valve are compared with one another. As a result, a fixed-amount opening operation pressure is supplied to the air operated valve having the maximum amount of operation. Concurrently, an operation pressure necessary for the output pressure to reach the objective pressure ratio is supplied to the other air operated valve. Thereby, the valve openings are regulated. In this manner, in the case that the normally closed air operated valve not specified as the control objective is securely controlled to a fixed opening, normally optimal conductance can be maintained, and increase in the pressure on the upstream sides of the normally closed air operated valve can be restrained.

What is claimed is:

1. A relative pressure control system comprising:
   a plurality of air operated valves of a normally open type that are connected to an operation gas pipeline supplied with an operation gas;
   pressure sensors that are series connected to the respective air operated valves and that detect output pressures of the respective air operated valves;
   a control device that controls operation pressures of the respective air operated valves in accordance with the pressures detected by the pressure sensors; and
   an interlock mechanism that connects to the control device and that correlates the plurality of air operated valves to one another so that at least one of the plurality of air operated valves is normally opened,
   wherein an opening of a specified one of the plurality of air operated valves is regulated, and the operation gas is output at a predetermined division ratio.

2. A relative pressure control system according to claim 1, wherein the control device performs a comparison between output pressures and specifies one of the plurality of air operated valves as a control objective.

3. A relative pressure control system according to claim 1, further comprising abnormality detecting means, wherein when the operation gas is supplied by fully opening all the air operated valves, output pressures of the respective air operated valves are detected by the pressure sensors at a fixed interval, and the abnormality detecting means determines whether a pressure ratio of the output pressures exceeds a specified value and detects an abnormality when the pressure ratio exceeds the specified value.

4. A relative pressure control system according to claim 1, wherein the control device stores valve models that each determine an operation pressure of a specified one of the air operated valves for the pressure detected by the pressure sensor, and performs feed forward control of the specified one of the air operated valves by using the valve model.

5. A relative pressure control system according to claim 4, wherein the control device corrects the operation pressure of the specified air operated valve that underwent the feed forward control, by using the pressure detected by the pressure sensor connecting to the air operated valve undergoing the feed forward control.

6. A relative flow control system, comprising:
   a flow control device including a flow control valve connecting to a gas supply source, and flowrate sensing means for detecting a flowrate being output by the flow control valve, thereby to control the flow control valve in accordance with the results of detection by the flowrate sensing means;
   the operation gas pipeline connecting to the flow control device;
   a relative pressure control system including a plurality of air operated valves of a normally open type that are parallel connected to the operation gas pipeline, pressure sensors that are series connected to the respective air operated valves and that detect output pressures of the respective air operated valves, a control device that controls operation pressures of the respective air operated valves in accordance with the pressures detected by the pressure sensors, and an interlock mechanism that connects to the control device and that correlates the plurality of air operated valves to one another so that at least one of the plurality of air operated valves is normally opened, wherein an opening of a specified one of the plurality of air operated valves is regulated, the operation gas is output at a predetermined division ratio; and
   abnormality detecting means wherein when the operation gas is supplied by fully opening all the air operated valves, output pressures of the respective air operated valves are detected by the pressure sensors at a fixed interval, and the abnormality detecting means determines whether a pressure ratio of the output pressures exceeds a specified value and detects an abnormality when the pressure ratio exceeds the specified value.

7. A relative flow control system according to claim 6, wherein the control device stores valve models that each determine an operation pressure of a specified one of the air operated valves for the pressure detected by the pressure sensor, and performs feed forward control of the specified one of the air operated valves by using the valve model.

8. A relative flow control system according to claim 7, wherein the control device corrects the operation pressure of the specified air operated valve that underwent the feed forward control, by using the pressure detected by the pressure sensor connecting to the air operated valve undergoing the feed forward control.

9. A relative pressure control system comprising variable orifice means capable of performing variable control of a plurality of flow path areas in parallel to a single controlled-fluid supply pipeline, pressure sensors respectively series connected to the variable orifice means, and control means that controls open and close operations of the variable orifice means, wherein the controlled fluid is output at a predetermined division ratio from the plurality of variable orifice means, wherein:
   the control means includes
   arithmetic sections that calculate respective objective pressures of the plurality of variable orifice means in accordance with the predetermined division ratio and the results of detection of the pressure sensors, and
   a signal processor section that creates control signals to be supplied to the plurality of variable orifice means in accordance with the objective pressures and that outputs the control signals to all the variable orifice means; and
   before outputting the signals, the signal processor section outputs fixed-opening signals that each maintain conductance of the plurality of the variable orifice means at a fixed amount.

10. A relative pressure control system according to claim 9, wherein the fixed amount is in a range of from 65% or more to 95% or less of the conductance in a fully opened state.

11. A relative pressure control system comprising variable orifice means capable of performing variable control of a plurality of flow path areas in parallel to a single controlled-fluid supply pipeline, pressure sensors respectively series connected to the variable orifice means, and control means that controls open and close operations of the variable orifice means, wherein the controlled fluid is output at a predetermined division ratio from the plurality of variable orifice means.
   wherein:
   the control means includes arithmetic sections that normally calculate respective objective pressures of the plurality of variable orifice means in accordance with the predetermined division ratio and the results of detection of the pressure sensors, and a signal processor section that creates control signals to be supplied to the plurality of variable orifice means in accordance with the objective pressures and that normally outputs the control signals to all the variable orifice means, when the variable orifice means are of a normally open type, the signal processor section performs a comparison of an amount of operation in accordance with a difference between the objective pressure calculated by the arithmetic section in units of the variable orifice means and an output pressure detected by the pressure sensor; and the signal processor section creates a fixed-opening signal for one of the variable orifice means wherein the amount of operation is a minimum, and creates a control signal necessary for the output pressure to reach the objective pressure for the other variable orifice means.

12. A relative pressure control system according to claim 11, wherein the fixed amount is in a range of from 65% or more to 95% or less of the conductance in a fully opened state.

13. A relative pressure control system comprising variable orifice means capable of performing variable control of a plurality of flow path areas in parallel to a single controlled-fluid supply pipeline, pressure sensors respectively series connected to the variable orifice means, and control means that controls open and close operations of the variable orifice means, wherein the controlled fluid is output at a predetermined division ratio from the plurality of variable orifice means.

wherein:

the control means includes arithmetic sections that normally calculate respective objective pressures of the plurality of variable orifice means in accordance with the predetermined division ratio and the results of detection of the pressure sensors, and a signal processor section that creates control signals to be supplied to the plurality of variable orifice means in accordance with the objective pressures and that normally outputs the control signals to all the variable orifice means when the variable orifice means are of a normally closed type, the signal processor section performs a comparison of an amount of operation in accordance with a difference between the objective pressure calculated by the arithmetic section in units of the variable orifice means and an output pressure detected by the pressure sensor; and the signal processor section creates a fixed-opening signal for one of the variable orifice means wherein the amount of operation is a maximum, and creates, for the other variable orifice means, a control signal necessary for the output pressure to reach the objective pressure.

14. A relative pressure control system according to claim 13, wherein the fixed amount is in a range of from 65% or more to 95% or less of the conductance in a fully opened state.

* * * * *